(12) United States Patent
Uppala et al.

(10) Patent No.: US 11,777,875 B2
(45) Date of Patent: Oct. 3, 2023

(54) CAPTURING AND LEVERAGING SIGNALS REFLECTING BOT-TO-BOT DELEGATION

(71) Applicant: Microsoft Technology Licensing, LLC, Redmond, WA (US)

(72) Inventors: Anantha Deepthi Uppala, Mercer Island, WA (US); Chetan Bansal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 15/705,299

(22) Filed: Sep. 15, 2017

(65) Prior Publication Data

US 2019/0089655 A1    Mar. 21, 2019

(51) Int. Cl.
*H04L 51/02* (2022.01)
*G06Q 10/02* (2012.01)
*G06F 16/951* (2019.01)
*G06F 16/332* (2019.01)
*H04L 67/51* (2022.01)
(Continued)

(52) U.S. Cl.
CPC .......... *H04L 51/02* (2013.01); *G06F 16/3329* (2019.01); *G06F 16/951* (2019.01); *G06Q 10/02* (2013.01); *H04L 43/04* (2013.01); *H04L 67/51* (2022.05); *G06N 3/042* (2023.01);
(Continued)

(58) Field of Classification Search
CPC .............. G06F 16/3329; G06F 16/951; G06N 3/0427; G06N 5/027; G06N 7/005; G06Q 10/02; H04L 43/04; H04L 51/02; H04L 51/046; H04L 67/16; H04L 67/51
See application file for complete search history.

(56) References Cited

U.S. PATENT DOCUMENTS 5,187,735 A * 2/1993 Herrero Garcia ..... H04M 3/533
                                                    379/212.01
6,263,358 B1 * 7/2001 Lee .......................... G06F 8/458
                                                        718/100

(Continued)

FOREIGN PATENT DOCUMENTS

EP       1190339 A2    3/2002
WO    2014197635 A2   12/2014
(Continued)

OTHER PUBLICATIONS

"International Search Report and Written Opinion Issued In PCT Application No. PCT/US2018/040667", dated Oct. 26, 2018, 16 Pages.
(Continued)

*Primary Examiner* — Chris Parry
*Assistant Examiner* — Dixon F Dabipi
(74) *Attorney, Agent, or Firm* — Rainier Patents, P.S.

(57) ABSTRACT

A technique is described herein for capturing signals that indicate when any calling BOT delegates control to a called BOT, or when a calling BOT is preconfigured to contact a called BOT (e.g., as conveyed by a manifest file associated with the calling BOT). The technique can leverage these signals to facilitate the selection of BOTs. For example, the technique can use the signals to improve searches performed by a search engine and/or recommendation engine. The technique can also use the signals to generate metadata items that describe the properties of the available BOTs.

21 Claims, 11 Drawing Sheets

(51) Int. Cl.
H04L 43/04 (2022.01)
H04L 51/046 (2022.01)
G06N 5/02 (2023.01)
G06N 3/042 (2023.01)
G06N 7/01 (2023.01)

(52) U.S. Cl.
CPC ............... *G06N 5/027* (2013.01); *G06N 7/01* (2023.01); *H04L 51/046* (2013.01)

(56) References Cited

U.S. PATENT DOCUMENTS

| | | | |
|---|---|---|---|
| 6,499,021 | B1 | 12/2002 | Abu-Hakima |
| 7,139,798 | B2 | 11/2006 | Zircher et al. |
| 7,562,115 | B2 | 7/2009 | Zircher et al. |
| 9,327,194 | B2 | 5/2016 | Douceur et al. |
| 9,401,989 | B2 | 7/2016 | Uba et al. |
| 9,699,239 | B1 | 7/2017 | Hays et al. |
| 9,761,222 | B1 | 9/2017 | Scarasso et al. |
| 10,381,006 | B1* | 8/2019 | Eriksson ............ G06F 16/3334 |
| 2001/0039562 | A1* | 11/2001 | Sato .................... G06F 16/2471 709/202 |
| 2002/0087366 | A1* | 7/2002 | Collier .................. G06Q 10/02 705/5 |
| 2003/0023463 | A1* | 1/2003 | Dombroski ............ G06Q 10/02 705/5 |
| 2003/0046118 | A1* | 3/2003 | O'Donnell ............. G06Q 10/02 705/5 |
| 2003/0182391 | A1 | 9/2003 | Leber et al. |
| 2004/0088206 | A1* | 5/2004 | Thompson ............. G06Q 10/06 718/104 |
| 2007/0260495 | A1* | 11/2007 | Mace ...................... G06Q 10/02 709/201 |
| 2008/0089490 | A1 | 4/2008 | Mikkonen et al. |
| 2008/0120421 | A1* | 5/2008 | Gupta .................... G06Q 10/10 709/229 |
| 2009/0043637 | A1* | 2/2009 | Eder .................... G06Q 10/067 705/35 |
| 2009/0292778 | A1 | 11/2009 | Makar et al. |
| 2010/0296417 | A1 | 11/2010 | Steiner |
| 2014/0365885 | A1* | 12/2014 | Carson ................ G06F 16/3344 715/708 |
| 2015/0074027 | A1 | 3/2015 | Huang et al. |
| 2016/0012366 | A1* | 1/2016 | Srivastava ....... G06Q 10/06313 705/7.23 |
| 2016/0358240 | A1 | 12/2016 | Redfern et al. |
| 2017/0017635 | A1 | 1/2017 | Leliwa et al. |
| 2017/0048170 | A1* | 2/2017 | Smullen ................ H04L 67/322 |
| 2017/0068423 | A1* | 3/2017 | Napolitano .......... G06F 16/3329 |
| 2017/0180284 | A1 | 6/2017 | Smullen et al. |
| 2017/0250935 | A1* | 8/2017 | Rosenberg ............. H04L 51/02 |
| 2017/0269972 | A1* | 9/2017 | Hosabettu ............. G06F 9/4843 |
| 2017/0279682 | A1* | 9/2017 | Dawson ............. H04L 41/0893 |
| 2017/0288942 | A1* | 10/2017 | Plumb .................. H04L 41/046 |
| 2017/0289305 | A1 | 10/2017 | Liensberger et al. |
| 2017/0293834 | A1* | 10/2017 | Raison ................... G06N 3/006 |
| 2017/0324867 | A1* | 11/2017 | Tamblyn ................ H04L 51/24 |
| 2017/0366621 | A1* | 12/2017 | Sagar ..................... H04L 67/02 |
| 2018/0083894 | A1* | 3/2018 | Fung .................... H04L 51/046 |
| 2018/0150524 | A1* | 5/2018 | Anger ..................... H04L 51/02 |
| 2018/0181558 | A1* | 6/2018 | Emery ................. H04M 3/4936 |
| 2019/0149488 | A1 | 5/2019 | Bansal et al. |
| 2020/0073999 | A1* | 3/2020 | Zucker .................... G10L 15/22 |

FOREIGN PATENT DOCUMENTS

| | | |
|---|---|---|
| WO | 2017070126 A1 | 4/2017 |
| WO | 2017112796 A1 | 6/2017 |

OTHER PUBLICATIONS

Surmenok, Pavel, "Power of Bot Discovery in Google Assistant," available at <<https://chatbotslife.com/power-of-bot-discovery-in-google-assistant-cb172704348a>>, Chatbot's Life, Medium, Jan. 22, 2017, 5 pages.

Rodriguez, Jesus, "Analytics, Integration, Language Understanding: The Bot Ecosystem is Exploding," available at <<https://chatbotsmagazine.com/analytics-integration-language-understanding-the-bot-ecosystem-is-exploding-cb60aed2524e>>, Chatbots Magazine, Medium, Jul. 13, 2016, 4 pages.

Rodriguez, Jesus, "Some thoughts About Bot Discovery," available at <<https//medium.com/@jrodthoughts/some-thoughts-about-bot-discovery-d9c4a554d2a7>>, Medium, Nov. 18, 2016, 4 pages.

Johnson, Khari, "Microsoft's plan to create a bot search engine," available at <<https://venturebeat.com/2016/10/22/microsofts-plan-to-create-a-bot-search-engine/>>, VentureBeat, Oct. 22, 2016, 4 pages.

Constine, Josh, "Facebook Messenger launches group bots and bot discovery tab," available at <<https://techcrunch.com/2017/04/18/facebook-bot-discovery/>>, TechCrunch, Apr. 18, 2017, 8 pages.

Boutin, Paul, "There's a Bot for That! A Search Engine for Finding Bots," available at <<https://web.archive.org/web/20170920171927/https:/chatbotsmagazine.com/theres-a-bot-for-that-a-search-engine-for-finding-bots-8a2c1145072b>>, Chatbots Magazine, Medium, Mar. 14, 2017, 2 pages.

Merritt, Arte, "Dashbot Partners with Google to Provide Analytics and Actionable Insights for Google Assistant," available at <<https://chatbotsmagazine.com/dashbot-partners-with-google-to-provide-analytics-and-actionable-insights-for-google-assistant-7f03d6ebb6f1>>, Chatbots Magazine, Medium, Dec. 8, 2016, 2 pages.

Yeung, Ken, "Dashbot now helps bot developers building on Google Assistant measure what works," available at <<https://venturebeat.com/2016/12/08/dashbot-now-helps-bot-developers-building-on-google-assistant-measure-what-works/>>, VentureBeat, Dec. 8, 2016, 6 pages.

Bansal, et al., "Providing and Leveraging Implicit Signals Reflecting User-to-BOT Interaction," U.S. Appl. No. 15/810,049, filed Nov. 11, 2017, 72 pages.

Coumau, et al., "A smart home is where the bot is," avaiable at <<http://www.mckinsey.com/business-functions/digital-mckinsey/our-insights/a-smart-home-is-where-the-bot-is>>, in McKinsey Quarterly, Jan. 2017, 9 pages.

Mamei, et al., "Motion Coordination in the Quake 3 Arena Environment: A Field-Based Approach," available at <<https://books.google.co.in/books?id=Rzz3BwAAQBAJ&pg=PA265&lpg=PA265&dq20a%20team%20of%20bots&f=false#v=onepage&q&&f=false>>, Google Books excerpt, from Proceedings of the First International Conference on Environments for Multi-Agent Systems, LNCS, vol. 3374, Springer-Verlag, p. 265.

Cook, AI, "Using Bots To Route Customer Requests Based On Sentiment and Emotion," available at <<https://www.twilio.com/blog/2016/10/using-bots-to-route-customer-requests-based-on-sentiment-and-emotion.html>>, in Twilio Blog, Oct. 12, 2016, 8 pages.

"Slack API," available at <<https://api.slack.com/bot-users>>, Slack Technologies, Inc., San Francisco, CA, accessed an Sep. 6, 2017, 15 pages.

"How the Bot Framework works," available at <<https://docs.microsoft com/en-us/bot-framework/overview-how-bot-framework-works>>, Microsoft Corporation, Redmond, WA, Aug. 4, 2017, 5 pages.

"International Search Report And The Written Opinion Issued in PCT Application No. PCT/US2018/058820", dated Feb. 13, 2019, 12 Pages.

"Notice of Allowance Issued in U.S. Appl. No. 15/810,049", dated Jan. 23, 2020, 10 Pages.

"Non Final Office Action Issued in U.S. Appl. No. 15/810,049", dated Oct. 2, 2019, 31 Pages.

Radziwill, et al., "Evaluating Quality of Chatbots and Intelligent Conversational Agents", In Journal of The Computing Research Repository, Apr. 2017, 21 Pages.

Yao, Mariya, "Top 6 Conversational Skills To Teach Your Chatbots", Retrieved from: https://medium.com/topbots/top-6-conversational-skills-to-teach-your-chatbots-ec4eb019a23d, Sep. 13, 2016, 10 Pages.

(56) References Cited

OTHER PUBLICATIONS

"Office Action Issued in European Patent Application No. 18811974. 7", dated Jun. 22, 2021, 4 Pages.
"Office Action Issued in European Patent Application No. 18752321. 2", dated Feb. 2, 2023, 7 Pages.
"Office Action Issued in European Patent Application No. 18752321. 2", dated Oct. 28, 2021, 6 Pages.
"Notice of Allowance Issued in European Patent Application No. 18811974.7", dated Apr. 18, 2023, 8 Pages.

* cited by examiner

OVERVIEW OF OPERATION OF THE SYSTEM
802

AUTOMATICALLY DETECT, USING DETECTION LOGIC, AN OCCASION IN WHICH ANY FIRST BOT, REFERRED TO AS A CALLING BOT, DELEGATES CONTROL TO A SECOND BOT, REFERRED TO AS A CALLED BOT, IN A COURSE OF PROVIDING A SERVICE TO A USER, OR DETECTING THAT THE CALLING BOT IS PRECONFIGURED TO INTERACT WITH THE CALLED BOT
804

↓

STORE A SIGNAL IN A SIGNAL DATA STORE IN RESPONSE TO THE DETECTING OPERATION
806

↓

SELECT A CANDIDATE BOT WITHIN THE COLLECTION OF BOTS BASED ON A COLLECTION OF FEATURES, INCLUDING AT LEAST ONE FEATURE THAT IS BASED ON SIGNALS STORED IN THE SIGNAL DATA STORE
808

↓

PROVIDE AN OUTPUT RESULT (CONVEYED BY AN OUTPUT SIGNAL) THAT CONVEYS THE CANDIDATE BOT THAT HAS BEEN SELECTED
810

↓

INVOKE THE CANDIDATE BOT IDENTIFIED IN THE OUTPUT RESULT IN RESPONSE TO AN ACTIVATION EVENT
812

FIG. 8

OVERVIEW OF OPERATION OF THE SEARCH ENGINE
902

RECEIVE AN INPUT QUERY FROM A USER COMPUTING DEVICE OPERATED BY THE USER
904

PROVIDE FEATURES FOR EACH BOT UNDER CONSIDERATION AMONG THE COLLECTION OF BOTS, AT LEAST ONE OF THE FEATURES BEING BASED ON THE SIGNALS STORED IN THE SIGNAL DATA STORE
906

GENERATE A SCORE FOR EACH BOT UNDER CONSIDERATION BASED ON THE FEATURES, THE SCORE REFLECTING AN EXTENT TO WHICH THE BOT UNDER CONSIDERATION MATCHES THE INPUT QUERY
908

CHOOSE ONE OR MORE BOTS BASED ON THE SCORES ASSOCIATED WITH THE RESPECTIVE BOTS UNDER CONSIDERATION, THE BOT(S) INCLUDING AT LEAST THE CANDIDATE BOT
910

SEND THE OUTPUT RESULT THAT IDENTIFIES AT LEAST THE CANDIDATE BOT TO THE USER COMPUTING DEVICE
912

RECEIVE AN INSTRUCTION BY THE USER COMPUTING DEVICE TO ACTIVATE THE CANDIDATE BOT, WHEREIN THE ACTIVATION EVENT CORRESPONDS TO THE INSTRUCTION SENT BY THE USER COMPUTING DEVICE TO ACTIVATE THE CANDIDATE BOT
914

FIG. 9

CAPTURING AND LEVERAGING SIGNALS REFLECTING BOT-TO-BOT DELEGATION

BACKGROUND

A BOT refers to a computer-implemented agent that provides a service to a user. For example, a hotel may provide an Internet-accessible BOT to assist a user in reserving a hotel room through a conversational "chatbot" interface, provided by (or accessible via) a messaging-type application. In some cases, a user interacts with several such BOTs in performing a task. For example, in planning a trip, a user may interact with a hotel-sponsored BOT to reserve a hotel room, and then interact with a car rental-sponsored BOT to reserve an automobile for the trip.

Presently, there are a large number of BOTs from which a user may choose in performing a given task. Moreover, this number can be expected to increase with the growing popularity of BOTs. While this trend increases the breadth of services available to users, it may also lead to complications. For instance, a user may have difficulty finding and accessing BOTs that have sought-after capabilities in an efficient manner.

SUMMARY

A technique is described herein for capturing signals that indicate when any first BOT, referred to herein as a "calling BOT," delegates control to a second BOT, referred to as a "called BOT," or when the calling BOT is preconfigured to contact the called BOT (e.g., as conveyed by a manifest file associated with the calling BOT). The technique can then leverage these signals to facilitate the selection of BOTs in an efficient manner.

For instance, a search engine can receive an input query that describes a BOT that the user is attempting to find. The search engine then performs a search to find one or more candidate BOTs that match the user's input query. That search is based on a number of features, including at least one kind of feature that is based on the stored signals that reflect BOT-to-BOT delegation.

In another implementation, a recommendation engine can receive an input signal that identifies a reference BOT, e.g., corresponding to a BOT with which the user is currently interacting or viewing. The recommendation engine then performs a search to find one or more candidate BOTs that are suitable complements to the reference BOT. That search is again based on a number of features, including at least one kind of feature that is based on the stored signals that reflect BOT-to-BOT delegation. In some cases, the technique can offer an output result to the user which conveys the recommended candidate BOT(s). The user may then choose among the recommended candidate BOTs. In other cases, the technique can automatically invoke a top-ranked candidate BOT upon the occurrence of a triggering event.

In yet another implementation, a metadata-supplementing component can leverage the stored signals to generate metadata items regarding any BOT under consideration. For example, the metadata-supplementing component can use the signals to generate metadata items that describe the presumed capabilities of a collection of BOTs. The search engine and the recommendation engine, in turn, can leverage these metadata items to improve the accuracy of their respective searches.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 8 is a flowchart that shows one manner of operation of the system shown in FIG. 1.

FIG. 9 is a flowchart that shows one manner of operation of the search engine of FIG. 5.

Figure 1:
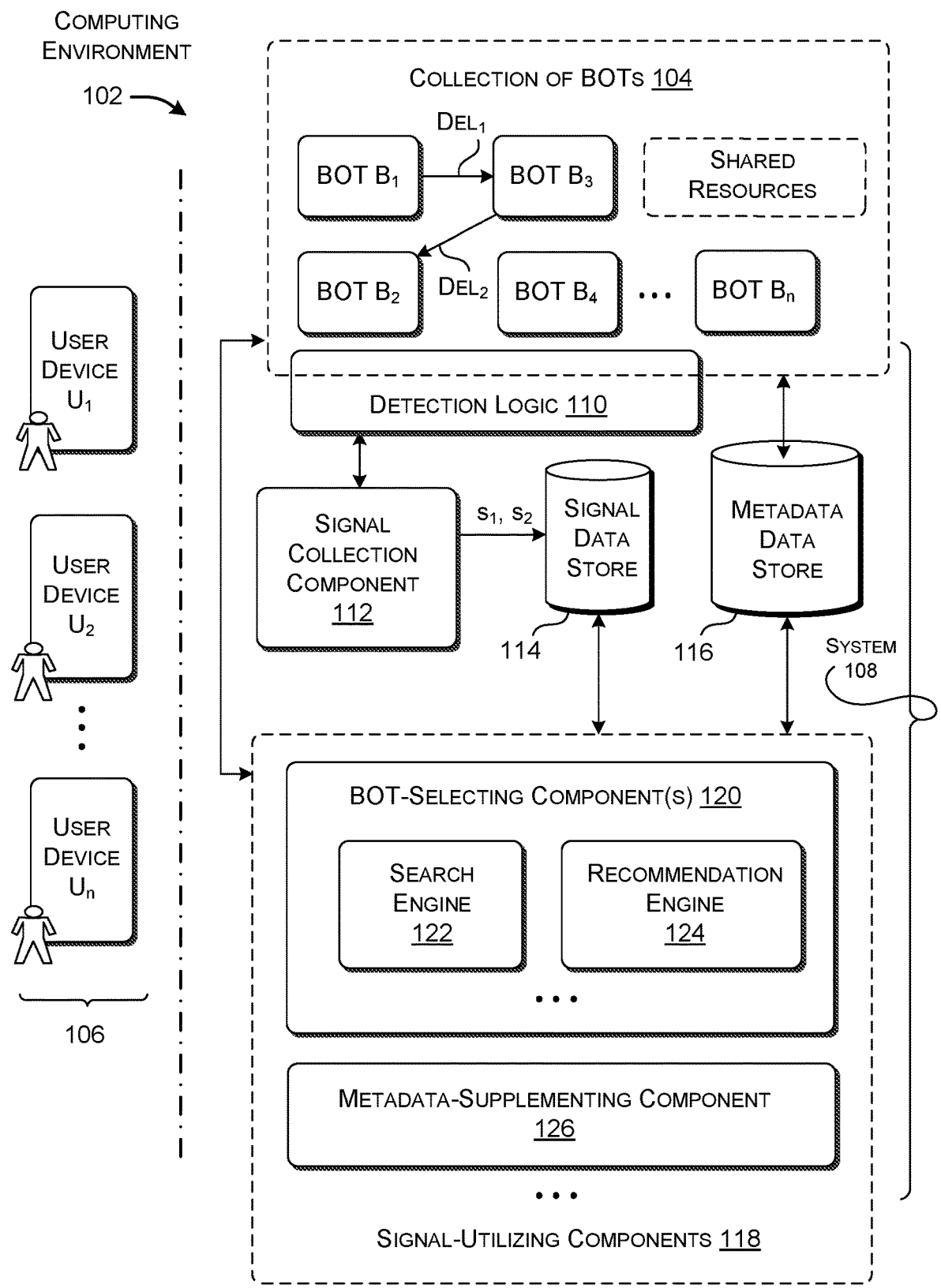
FIG. 1 shows a computing environment that includes a collection of BOTs and a complementary system for interacting with the collection of BOTs.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for detecting interaction among BOTs in a computing environment, and for leveraging information regarding that interaction to help select BOTs and perform other functions. Section B sets forth illustrative methods which explain the operation of the system of Section A. Section C describes representative BOT logic that can be used to implement some BOTs. And Section D describes illustrative computing functionality that can be used to implement any aspect of the features described in Sections A-C.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section D provides additional information regarding one implementation of the hardware logic circuitry.

The term "component" refers to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Fig. D, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section D. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section D. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

A.1. Overview

FIG. 1 shows a computing environment 102 that includes a collection of BOTs 104. A BOT, which is a variant of the word "robot," refers to a computer-implemented agent that provides any service to a user in response to input information provided by the user. For instance, one kind of BOT can assist the user in making a reservation to a restaurant. Another type of BOT can help a user in performing a financial transaction. Another type of BOT can guide a user in installing a software product, and so on. No constraint is placed herein on the task(s) that a BOT may perform, and the manner in which it performs those tasks. Additional information regarding the composition of representative BOTs is provided below in Subsection A.3 and Section C. Any number of users may interact with the BOTs via respective user computing devices 106.

As described below, some BOTs correspond to messaging-type applications that host a conversational interface, such as a "chatbot" interface. But the BOTs in the collection of BOTs 104 are not limited thereto.

In one implementation, the computing environment 102 provides a single computing platform which hosts the collection of BOTs 104. A single entity may administer the computing platform. Different creators of BOTs may submit their BOTs to the computing platform. A user may access the collection of BOTs 104 by interacting with the single computing platform. For example, the user may search for a desired BOT by accessing a network site associated with the single computing platform, and, upon finding the desired BOT, invoke it. In other cases, different providers may host different BOTs within the collection of BOTs 104.

The computing platform can optionally host computing resources ("shared resources") for use by the BOTs 104. Without limitation, in one implementation, the resources can include a BOT connector component that allows users to interact with any BOT in the computing platform via any communication channel, such as a separate communication application of any type (such as the SLACK application provided by Slack Technologies, Inc., of San Francisco, Calif., or the SKYPE application provided by Microsoft Corporation of Redmond, Wash., etc.). The connector component performs this task by exchanging messages between a BOT and the separate communication application. The resources can also include various services that may be relied on by any BOT, such as translation services, entity extraction services, etc.

A system 108 captures signals that describe interaction among the BOTs 104, and then uses those signals to perform various functions. More specifically, the system 108 includes detection logic 110 that automatically detects when any first BOT, referred to herein as a "calling BOT," calls a second BOT, referred to as a "called BOT." Or the detection logic 110 automatically detects when the calling BOT is preconfigured to call the calling BOT. For instance, assume that the user is in the process of performing a task that involves plural subtasks, such as reserving a hotel room, reserving a rental car, etc. Further assume that the computing environment 102 provides different BOTs to perform these different subtasks. The detection logic 110 detects, for instance, when a hotel-related BOT delegates control to a car rental-related BOT, or when the hotel-related BOT is preconfigured to delegate control to the car rental-related BOT. In response to the conclusion reached by the detection logic 110, a signal collection component 112 stores a signal in a signal data store 114; that signal reflects the delegation of control between BOTs, or reflects the authorized delegation of control between BOTs (which may not have happened yet).

FIG. 1 shows an example of the transfer of control among BOTs to illustrate the above concepts. In that example, a user begins a multi-part task by interacting with a BOT $B_1$. BOT $B_1$ eventually delegates control to $BOT_3$, and then BOT $B_3$ delegates control to BOT $B_2$. The detection logic 110 automatically detects these transfers and communicates its finding to the signal collection component 112. In response, the signal collection component 112 stores a first signal 51 that indicates that the BOT $B_1$ has delegated control within the multi-part transaction to BOT $B_3$. The signal collection component 112 stores a second signal sz that indicates that the BOT $B_3$ has delegated control to BOT $B_2$. Subsection A.2 (below) provides additional information regarding the operation of the detection logic 110 and the signal collection component 112.

Different parts of the computing environment 102 can implement the detection logic 110 with respect to different respective implementations. In some cases, an individual calling BOT performs a role in detecting the transfer of control from that calling BOT to another (called) BOT. FIG. 1 makes this point by showing that the detection logic 110 overlaps the collection of BOTs 104. Alternatively, or in addition, the signal collection component 112 performs a role in detecting the transfer of control between BOTs. Alternatively, or in addition, some other component(s) in the computing environment 102 (besides the calling BOT and the signal collection component 112) perform a role in detecting the transfer of control between BOTs.

Consider, for instance, the case in which the detection logic 110 represents a component that is external to the calling BOT and the collection component 112. In that case, the detection logic 110 can intercept messages sent to and/or received from the calling BOT. Alternatively, or in addition, the detection logic 110 can detect Application Programming Interface (API) calls and/or commands exchanged between the calling BOT and the called BOT. Alternatively, or in addition, the detection logic 110 can interrogate the capabilities of the calling BOT, e.g., by probing a manifest file associated with the calling BOT that describes the BOTs it is authorized to interact with. Again, Subsection A.2 provides additional information regarding these functions.

Another data store, referred to as a metadata data store 116, stores metadata regarding the BOTs in the collection of BOTs 104. For example, the metadata can describe the intents that each BOT is designed to fulfill. As used herein, an "intent" identifies a nature of a task to be performed. For example, a user who enters the message "Purchase ticket" evinces an intent to make a purchase, or, more generally, to perform a financial transaction. The metadata data store 116 can also store information regarding each BOT's title, description, rating, classification, provider, etc.

One or more signal-utilizing components 118 perform various functions based, in part, on the signals stored in the signal data store 114. For instance, one or more BOT-selecting components 120 perform the general task of selecting one or more candidate BOTs from a larger collection of BOTs that are described in the metadata data store 116. The BOT-selecting components 120 rely on the signals in the signal data store 114 to help identify suitable candidate BOTs.

In some cases, a BOT-selecting component can send an output result which identifies the candidate BOT(s) to a user computing device. The user may view the output result and then invoke one of the candidate BOTs specified therein. In other cases, some component within the computing environment 102 (such as a calling BOT) can automatically invoke one of the candidate BOTs that has been identified, e.g., by automatically invoking a top-ranking candidate BOT. In either case, the computing environment 102 can be said to invoke a candidate BOT in response to an activation event. In the first case, the activation event corresponds to an instruction from a user. In the second case, the activation event corresponds to an instruction generated by some component within the computing environment 102 to automatically activate an identified candidate BOT.

FIG. 1 identifies two kinds of BOT-selecting components: a search engine 122 and a recommendation engine 124. The search engine 122 performs a BOT-related search based on an input query submitted by a user via a user computing device. The search engine 122 performs this search based on various features. The search engine 122 generates at least one kind of feature based on the signals in the signal data store 114. Subsection A.4 (below) provides additional information regarding the composition and operation of the search engine 122.

The recommendation engine 124 provides recommendations to a user in the context of a reference BOT. For example, the reference BOT may correspond to a BOT with which the user is currently interacting, or at least viewing; the recommendation engine 124 recommends one or more candidate BOTs that complement the reference BOT, e.g., by recommending a car rental-related BOT in the context of the user's current interaction with a hotel-related BOT. As in the case of the search engine 122, the recommendation engine 124 generates its recommendations based on various features. Further, the recommendation engine 124 generates at least one kind of feature based on the signals in the signal data store 114. Subsection A.5 (below) provides additional information regarding the composition and operation of the recommendation engine 124.

The signal-utilizing components 118 also include a metadata-supplementing component 126. The metadata-supplementing component 126 generates one or more metadata items pertaining to at least one BOT under consideration based on the signals stored in the signal data store 114. The metadata items describe properties of the BOT under consideration, thereby improving available knowledge about the BOT under consideration. For example, consider the case in which a signal indicates that a given BOT calls one or more other BOTs to perform a specified intent; that signal constitutes evidence that the given BOT cannot perform the specified intent. Consider next the case in which a signal indicates that the given BOT is called by one or more other BOTs to perform a specified intent; that signal constitutes evidence that the given BOT performs the specified intent. Subsection A.6 (below) provides additional information regarding the composition and operation of the metadata-supplementing component 126.

The above-identified signal-utilizing components 118 are identified by way of example, not limitation. Other implementations can provide other components that rely on the signals in the signal data store 114 to perform various functions.

Generally, the signal-utilizing components 118 facilitate the ability of the user to locate desired BOTs in an efficient manner. That is, by taking into consideration signals reflecting BOT-to-BOT delegations, the search engine 122 and the recommendation engine 124 can provide more accurate output results. This, in turn, enables the user to access a desired BOT in an efficient manner, e.g., by foregoing an extended search for a desired BOT, and by reducing the risk of selecting a suboptimal BOT upon not finding the most suitable BOT, etc. Moreover, the environment 102 benefits from the efficient searches performed by users by consuming its resources (e.g., its processing, memory, communication resources, etc.) in an efficient manner.

Note that FIG. 1 illustrates that the signal-utilizing components 118 are separate and distinct from the collection of BOTs 104. While this indeed represents one implementation, in other cases, any function attributed to a signal-utilizing component can be performed by a BOT and/or some other component within the computing environment 102, in whole or in part. For instance, a hotel-related BOT can incorporate a hotel-specific recommendation engine. Hence, the scope of what is referred to herein as the "system" 108 is to be liberally construed.

Figure 2:
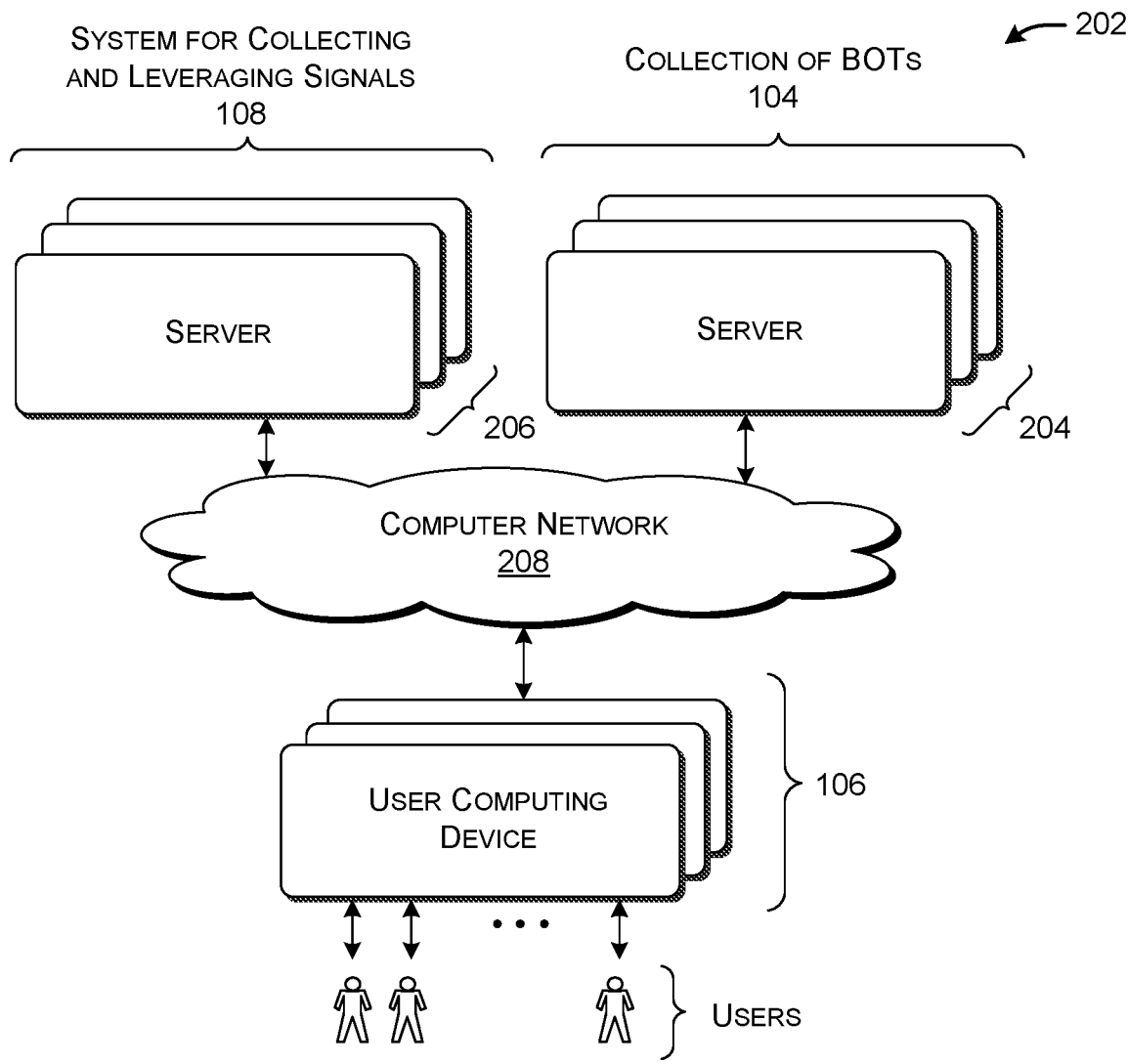
FIG. 2 shows computing equipment that can be used to implement the computing environment of FIG. 1.

FIG. 2 shows computing equipment 202 that can be used to implement the computing environment 102 of FIG. 1. In one implementation, the computing equipment 202 can include one or more servers 204 that implement the BOTs 104. The servers 204 may be associated with a single computing platform hosted by a single entity. Or the servers 204 may be associated with two or more computing platforms, potentially administered by two or more respective entities.

The computing equipment 202 may provide one or more other servers 206 that implement the system 108. Alternatively, the computing equipment 202 can devote the same servers for implementing the system 108 and at least some of the BOTs 104. In some cases, a single entity administers both the system 108 and the BOTs 104. In other cases, the entity which administers the system 108 differs from the entity which administers at least some of the BOTs 104.

A plurality of user computing devices 106 interact with the server(s) 204 that host the BOTs 104, as well as the server(s) 206 that host the system 108, via a computer network 208. Any user computing device can correspond to, without limitation, any of: a traditional desktop computing device; a laptop computing device; a smartphone; a tablet-type computing device; a set-top box; a game console; a virtual/augmented reality device; a wearable computing device, and so on. The computer network 208 can correspond to a wide area network (e.g., the Internet), a local area network, one or more point-to-point links, etc.

A.2. The Detection Logic and the Signal Collection Component

As described above, the purpose of the detection logic 110 is to automatically detect when any calling BOT has delegated control to a called BOT, or is at least authorized to call the called BOT. The signal collection component 112 stores a signal to memorialize any such event. The detection logic 110 and the signal collection component 112 can perform their respective tasks using different collection strategies.

In a first scenario, assume that a user is currently interacting with a first BOT, e.g., corresponding to an airline-related BOT that functions as a calling BOT. Further assume that the calling BOT provides a conversational interface that receives natural language input messages from the user, and which provides natural language output messages to the user. Finally, assume that both the user and the calling BOT itself can provide messages that include references to other BOTs. For example, the user may enter the command, "Transfer me to the @ABC Rental Company automated agent." Or the BOT may independently send the message, "Now transferring you to the @ABC Car Rental automated agent." In response to detecting a reference in the message flow (and/or in response to some other triggering event), the calling BOT may transfer control to the appropriate car rental-related BOT, which corresponds to the called BOT. The use of the "@" reference designator (corresponding to an "@mention") is merely illustrative; other implementations can use any other symbol to indicate that reference is being made to a called BOT, and/or can use natural language understanding (NLU) technology to detect that reference is being made to a called BOT.

In the above scenario, the detection logic 110 detects when the message flow associated with the calling BOT includes a telltale reference to a called BOT. For example, the detection logic 110 can detect when the calling BOT sends a message that mentions another BOT using the "@" symbol. Or the detection logic 110 can detect when a user mentions a called BOT in the course of interacting with the calling BOT, which causes the calling BOT to transfer control to the called BOT, etc.

In the above case, the detection logic 110 can correspond to any component that monitors the flow of messages associated with the calling BOT. In one implementation, the detection logic 110 is provided by the calling BOT itself. Alternatively, or addition, the detection logic 110 corresponds to a component that is external to the calling BOT. For example, the detection logic 110 may correspond to any component that intercepts the messages sent by and/or from the calling BOT, and detects a telltale reference to a called BOT in the messages. In either case, the detection logic 110 communicates its findings to the signal collection component 112. In response, the signal collection component 112 stores a signal that memorializes the detected delegation between BOTs.

In a second scenario, the calling BOT and the called BOT may exchange various information and control instructions via various API calls and/or commands. For example, the calling BOT may activate the called BOT via an API call or any kind of command. That call or command can provide information from the calling BOT to the called BOT. For example, an airline-related calling BOT may transfer information to the car rental-related BOT regarding the arrival of the user at a particular airport.

In the above scenario, the detection logic 110 corresponds to any component that detects the call(s) and/or command(s) exchanged between the calling BOT and the called BOT. That component can correspond to the calling BOT itself. Alternatively, or in addition, the detection logic 110 can correspond to some component that is external to the calling BOT; such a component can intercept the calls and/or commands sent between the calling BOT and the called BOT. In whatever manner implemented, the detection logic 110 communicates its findings to the signal collection component 112. In response, the signal collection component 112 stores a signal that memorializes the detected delegation between BOTs.

In a third scenario, the calling BOT (e.g., the airline-related BOT) contains a manifest file (or some other file) that indicates that the calling BOT is authorized to interact with the called BOT (e.g., the car rental-related BOT). In this situation, the detection logic 110 corresponds to any mechanism for interrogating the manifest file. That mechanism can be implemented, for instance, by the calling BOT. Alternatively, or in addition, the detection logic 110 can correspond to any component that is external to the calling BOT. In whatever manner implemented, the detection logic 110 can probe the manifest file at any juncture, such as on a periodic basis, or when the calling BOT is first installed in the computing platform that hosts the BOTs 104. Alternatively, or in addition, the detection logic 110 can interact with a subscription service, asking the subscription service to alert it when any changes have been made to the calling BOT's manifest file. In any case, the detection logic 110 provides its findings to the signal collection component 112, and, in response, the signal collection component 112 stores a signal that memorializes the collected information in the signal data store 114.

In a fourth scenario, a parent BOT operates as a central manager which interacts with two or more child BOTs. For example, the parent BOT can transfer control from the airline-related BOT to the car rental-related BOT by receiving information from the airline-related BOT and transferring that information to the car rental-related BOT. In that case, the parent BOT can implement at least part of the detection logic 110 by detecting when such an indirect delegation occurs. Alternatively, or in addition, a component that is external to the parent BOT can intercept the calls and commands made by the parent BOT. It can then determine whenever the parent BOT is transferring information and/or commands between child BOTs. In whatever manner implemented, the detection logic 110 can communicate its findings to the signal collection component 112, which then stores an appropriate signal in the signal data store 114.

The detection logic 110 and the signal collection component 112 can use yet other techniques; the above-identified four scenarios are described by way of example, not limitation. As noted above, the detection logic 110 can be implemented by different parts of the computing environment 102. However, any implementation of the detection logic 110 which avoids reliance on the BOTs can help reduce the risk of false reporting of delegation events. That is, such a configuration helps avoid a scenario in which a BOT falsely reports its delegation behavior, e.g., by inflating the number of delegation events for the purpose of improving the ranking of a calling BOT or a called BOT.

Figure 3:
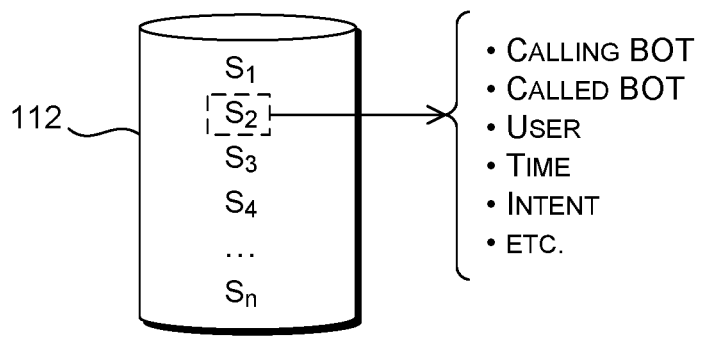
FIG. 3 shows a signal data store for storing signals that reflect BOT-to-BOT delegation.

FIG. 3 shows the signal data store 114 which stores signals ($s_1, s_2, \ldots, s_n$) that reflect BOT-to-BOT delegations. As also shown, any given signal can include multiple data items. For example, the signal $s_2$ can include a first data item that identifies the calling BOT (e.g., the airline-related BOT), a second data item that identifies the called BOT (e.g., the car rental-related BOT), a third data item that identifies the user who is interacting with the calling BOT at the time of delegation, a fourth data item that identifies a time at which the delegation occurred, a fifth data item that identifies an intent that the called BOT was called on to fulfill (e.g., reserving a rental car), and so on. This set of data items is illustrative; other implementations can include a different set of data items. The signal collection component 112 identifies the user in various ways, such as by providing a user account ID if available. If not available, the signal collection component 112 can identify the user by specifying an identifier associated with the browser that the user is using, for example.

The type of signals described above pertain to the raw attributes of any BOT-to-BOT interaction. The signal collection component 112 can also perform preliminary analysis on the raw signals to provide higher-level or derivative signals, such as by generating a count of signals that match specified criteria.

Further note that the signal collection component 112 also collects information from the manifest file of the calling BOT which indicates that the calling BOT is preconfigured to interact with the called BOT. The signal collection component 112 can provide metadata that identifies this signal as manifest-related information, rather than evidence of an actual transfer of control from the calling BOT to the called BOT.

A.3. An Illustrative BOT

Figure 4:
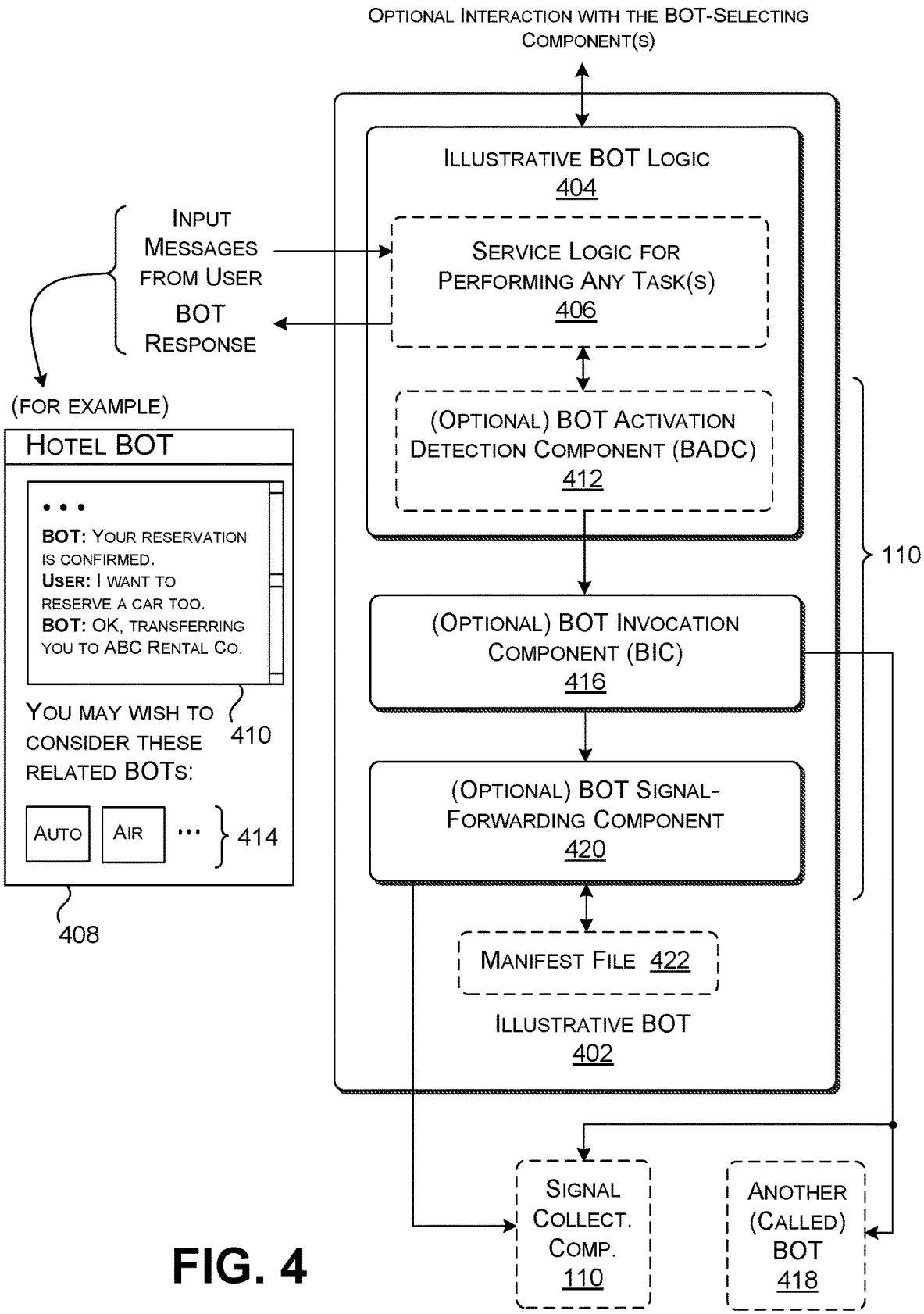
FIG. 4 shows an illustrative BOT for use in the computing environment of FIG. 1.

FIG. 4 shows an illustrative BOT 402 for use in the computing environment 102 of FIG. 1. Note, however, that the collection of BOTs 104 can include BOTs having differing program architectures, and which provide differing functions. Hence, the description here is provided in the spirit of illustration, not limitation.

The BOT 402 provides illustrative BOT logic 404 that performs various operations, including service logic 406 that performs various application-specific BOT functions. For example, the service logic 406 of a hotel-related BOT may provide a conversational interface that allows a user to reserve a hotel room. In some cases, the service logic 406 can perform this task using a stored dialog script. Alternatively, or in addition, the service logic 406 can perform this function using a machine-trained model, such as a Recursive Neural Network (RNN) which maps an input message received from a user to an output message which is delivered to the user.

In some cases, the service logic 406 interacts with a user via a text-based user interface presentation, such as the illustrative user interface presentation 408. For instance, the service logic 406 can present a user interface panel 410 through which the user may enter text messages to the BOT 402, and through which the BOT 402 may send messages to the user. Alternatively, or in addition, the service logic 406 may include a voice recognition component which receives spoken messages from the user, and a voice synthesizer which provides spoken responses to the user. Alternatively, or in addition, the service logic 406 can interact with the user via the user interface logic provided by another communication application, such as the SLACK application, etc. These are merely illustrative options; the service logic 406 can collect input information from the user using any interface technique, and can provide output information to the user using any technique.

The BOT logic 404 can also include a BOT activation detection component (BADC) 412. The BADC 412 detects when the user, in the course of interacting with the BOT 402 (which constitutes the calling BOT), makes an explicit or implicit request to activate a called BOT (such as a car-rental BOT) to be invoked, or when some other event occurs which triggers the activation of the called BOT. The BADC 412 can operate using one or more techniques. In a first technique, assume that the service logic 406 provides the hotel-related service via the user interface presentation 408. In addition to the user interface panel 410 (through which the user exchanges message with the BOT 402), the user interface presentation 408 can include a section that invites the user to activate one or more called BOTs, such as a car rental-related BOT, an airline-related BOT, etc. For instance, the user interface presentation 408 can include a set of icons 414 associated with the called BOTs, and/or a menu (not shown) associated with the called BOTs, etc. In that situation, the BADC 412 detects when the user activates a command associated with any one of the identified called BOTs, e.g., by clicking on one of the icons in the set of icons 414.

In a second technique, the BADC 412 determines whether the message flow between the user and the BOT 402 contains an explicit reference to a called BOT, e.g., using the "@" symbol or the like. For example, the BADC 412 determines whether the user has entered a message which contains the text "@ABC Car Rental automated agent." If so, the BADC 412 detects that the user wishes to invoke the car rental-related BOT. The BADC 412 makes this determination by comparing the text of a message against a table of known BOT names.

In a third technique, the BADC 412 uses an analysis component (such as a machine-trained model, a rules-based engine, etc.) to determine that the user has entered a message that evinces an intent to invoke a particular BOT or a particular type of BOT. For example, the BADC 412 can employ a Deep Neural Network (DNN) to determine whether the message contains one or more identifiable intents. Or the BADC 412 can use one or more rules to determine whether the message contains an identifiable intent, e.g., using one or more IF-THEN-structured rules or the like. One such rule, for instance, can determine that the user has expressed an intent to invoke a car rental-related BOT when the user enters a message containing the phrase "rental car" or the like.

In a fourth technique, the BADC 412 determines that some triggering event has occurred in the BOT's interaction with the user that warrants activating a called BOT. For example, an airline-related calling BOT can call a car rental-related BOT when certain junctures are reached in a conversation, such as when the user successfully completes an airline reservation.

The BADC 412 can determine intent in different application-specific ways. Further note that the BADC 412 can detect the user's intent with respect to different levels of scope. Again consider the example in which the user inputs a message that evinces an intent to find a rental car. In some cases, BADC 412 can determine that the user has expressed a general intent to access any rental car-related BOT when the user types "rental car" or the like, and without specifying other information that identifies a particular rental car company. The BADC 412 can map this general intent to a specific rental car company in any environment-specific way, such as by choosing a rental car BOT having a highest user rating and/or selecting a sponsored rental car BOT, etc. Or the BADC 412 can identify a specific BOT through a conversational exchange with the user, e.g., by giving the user a list of available rental car-related BOTs and asking the user to choose one of them.

In other cases, the BADC 412 can determine that the user has expressed an intent to access a specific type of rental car-related BOT, associated with a specific rental car company, when the user's input message contains one or more keywords (e.g., "AVIS") that are associated with that specific rental car company. The BADC 412 can implement the above-described intent-mapping functions using a keyword lookup and mapping component, and/or by using a machine-trained model, and/or by using a rules-based engine, etc.

FIG. 4 indicates that the BOT 402 implements the BADC 412. Alternatively, or in addition, some component that is external to the BOT 402 can perform the above-described functions of the BADC 412. For instance, an external component (such as the signal collection component 112) can intercept the signals between the user and the BOT 402. The external component can then use any technique described above to determine whether the user has explicitly or implicitly invoked a called BOT. For instance, the BADC 412 can leverage the analysis logic of one of the BOT-selecting components 120 (described below) in determining the intent of a user's input message.

In some implementations, a BOT invocation component 416 receives an instruction from the BADC 412 to invoke a particular BOT. In response, the BOT invocation component 416 invokes that BOT, e.g., by invoking a particular called BOT 418. In the process, the BOT 402 thereby delegates control to the called BOT 418.

An optional signal-forwarding component 420 can send information to the signal collection component 112 which alerts the signal collection component 112 that a delegation event has occurred. The signal-forwarding component 420 can perform this task using a push technique (without being requested by the signal collection component 112) or a pull technique (in response to a request from the signal collection component 112).

Further, the BOT 402 can include a manifest file 422 that contains information regarding the capabilities of the BOT 402. For instance the manifest file 422 can include the Uniform Resource Locators (URLs) (or other identifiers) that specify the called BOTs with which the BOT 402 is preconfigured and authorized to interact. For example, the manifest file 422 can contain the URL of the car rental-rental related BOT, corresponding to the called BOT 418. In that case, the signal-forwarding component 420 can also pass information regarding URL(s), if any, identified in the manifest file 422 to the signal collection component 112. The signal-forwarding component 420 can perform this operation using a push technique or a pull technique.

Note that the BADC 412, the BOT invocation component 416, and the BOT signal-forwarding component 420 play a role in the detection of delegation between BOTs, or the authorized delegation between BOTs. Hence these elements can be considered as part of the detection logic 110 described above. However, FIG. 4 represents just one implementation of the detection logic 110. As explained in detail in Subsection A.2, alternatively, or in addition, the detection logic 110 can use some other component(s) within the environment 102 (external to the BOT 402) to determine that the BOT 402 has called a called BOT.

Finally, FIG. 4 indicates that the BOT 402 can optionally interact with one or more of the BOT-detecting components shown in FIG. 1 for various purposes. For example, in some cases, the BOT 402 (again, which may correspond to a hotel-related BOT) may interact with the recommendation engine 124 to receive recommendations regarding BOTs that are suitable complements to the BOT 402. The BOT 402 can then optionally present these recommendations to the user in any manner, e.g., by presenting the recommendations via the set of icons 414.

In certain situations, the BOT 402 can also automatically invoke a called BOT based on information provided by the recommendation engine 124. For example, the BOT 402 can receive information from the recommendation engine 124 that indicates that a particular BOT X, corresponding to a particular car rental company, is a suitable complement to the BOT 402. Thereafter, when the BOT 402 detects a certain triggering event, it can automatically invoke that BOT X. For example, the BOT 402 can invoke the BOT X when the user makes an explicit or implicit reference to the rental-related BOT in a message that it sends to the BOT 402, e.g., by entering the message, "I want to reserve a car too," or the like. Note that the computing environment 102 can dynamically modify the linking behavior of such a BOT 402 by automatically updating its list of related BOTs. For instance, the BOT 402 can replace reference to the BOT X with a reference to a BOT Y based on information provided by the recommendation engine 124, where BOT Y corresponds to another car rental company.

A.4. The Search Engine

Figure 5:
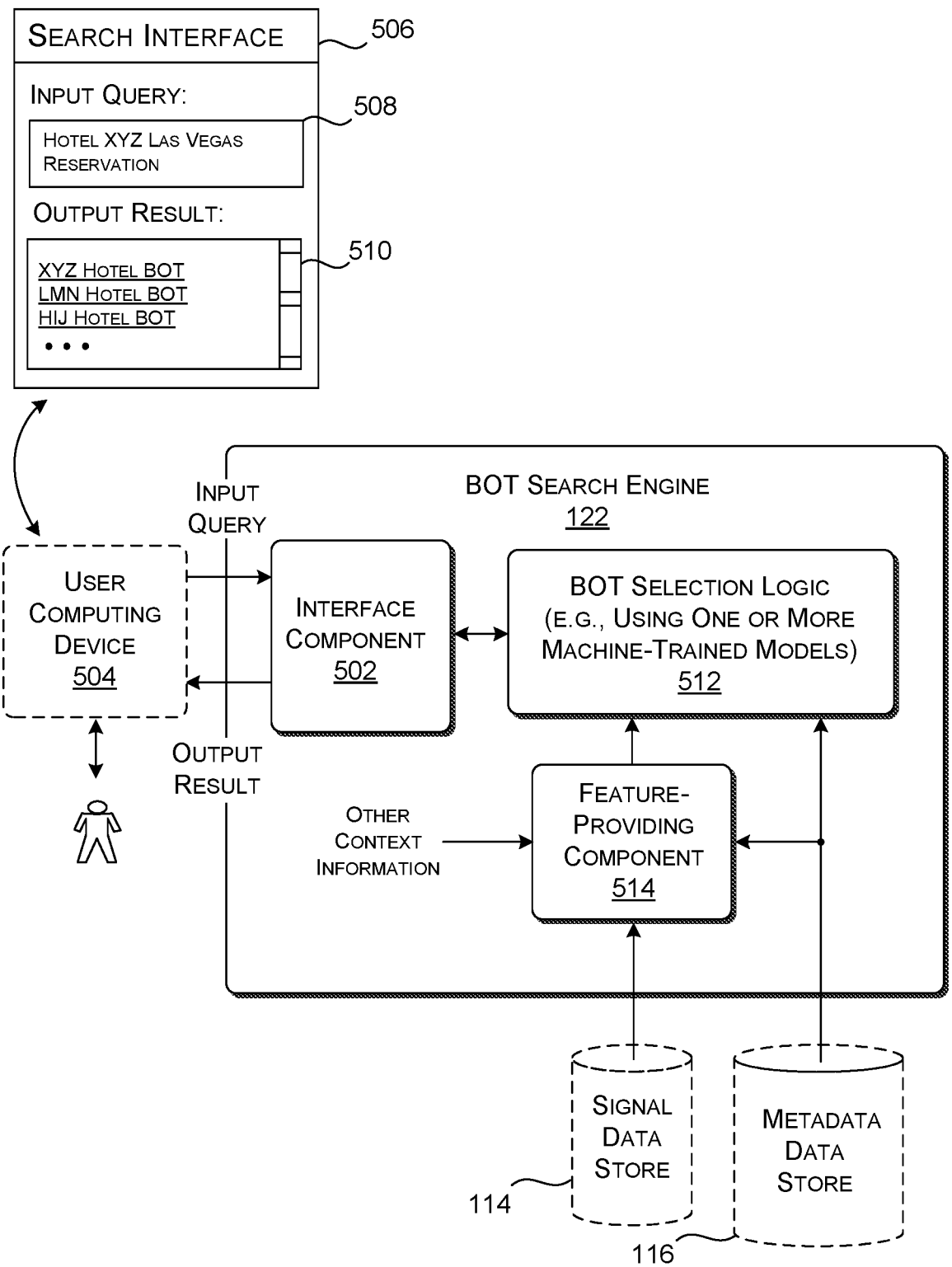
FIG. 5 shows one implementation of a search engine for use in the computing environment of FIG. 1.

FIG. 5 shows one implementation of the search engine 122 introduced in the context of FIG. 1. The search engine 122 includes an interface component 502 for interacting with a user via a user computing device 504. In one implementation, the interface component 502 provides a user interface presentation 506. The user interface presentation 506 includes a section 508 through which the user may enter an input query. The input query contains text that describes a BOT that the user wishes to find, e.g., by specifying one or more descriptive keywords. For instance, assume that the user wishes to interact with a BOT associated with a particular Las Vegas hotel (the generically-named "XYZ" hotel). In that case, the user may enter the illustrative input query: "Hotel XYZ Las Vegas Reservation." The user interface presentation 506 includes a section that provides an output result 510 which identifies one or more candidate BOTs that the search engine 122 has identified as a result of its search. The user may click on or otherwise activate one of the candidate BOTs to invoke it. Alternatively, or in addition, the search engine 122 can interact with the user via a voice-enabled interface, and/or some other kind of interface.

The search engine 122 includes BOT selection logic 512 that maps the user's input query into the output result. The BOT selection logic 512 can perform this operation using any technique. Generally, the BOT selection logic 512 assigns a score to each candidate BOT in a collection of BOTs identified in the metadata data store 116. The score measures an extent to which the candidate BOT matches the input query. The BOT selection logic 512 generates the score based on a collection of features. Each feature describes some aspect of the context in which the search is performed. Without limitation, for instance, the features can encompass: characteristics regarding the input query (including the text of the input query, etc.); characteristics regarding the candidate BOT under consideration (including its name, classification, provider/creator, intent-related capabilities, rating, etc.); the circumstances in which the search is performed (such as the time and place in which the search is performed); characteristics of the user performing the search (such as the user's demographic profile, preferences, etc.), and so on.

In some implementations, the BOT selection logic 512 can apply a machine-learned model to generate the score. For example, the BOT selection logic 512 can use a model which computes the score as a weighted combination of different feature values. A training system (not shown) can compute the weights in an offline training procedure, and/or a designer can hand-tune the weights. In another example, the BOT selection logic 512 can use any type of deep neural network (DNN) to compute the score. Such a model can map an input vector associated with the input query into a first vector ($v_1$) in a high-level semantic space, and then map an input vector associated with the BOT under consideration (and all the features associated therewith) into a second vector ($v_2$) in the high-level semantic space. The model can then compute the score based on the relation of these two vectors in the high-level semantic space, e.g., using any metric of similarity, such as cosine similarity. A training system (not shown) can compute the weights of the neural network in an offline training procedure.

For example, a DNN can correspond to a feedforward neural network that has N layers. The values $z_j$ in any layer $j$ in this feedforward neural network can be given by the formula, $z_j = f(W_j z_{j-1} + b_j)$, for $j = 2, \ldots N$. The symbol $W_j$ denotes the j-th weight matrix produced by a training system, and the symbol $b_j$ refers to an optional j-th bias vector, also produced by the training system. The function $f(x)$ corresponds to any activation function, such as the tanh function. Information regarding this kind of model is described, for instance, in U.S. patent application Ser. No. 14/019,563, to Huang, et al., filed on Sep. 6, 2013, and entitled "A Deep Structured Semantic Model Produced Using Click-Through Data." More generally, the above-described models are cited by way of example, not limitation; the BOT selection logic 512 can use any strategy to assign a score to each candidate BOT.

In other cases, the BOT selection logic 512 can include two or more models that operate in any configuration, such as a series combination. For example the BOT selection logic 512 can include a first phase (L1) which determines the lexical similarity between the input query and textual information regarding each candidate BOT. The BOT selection logic 512 can use any algorithm to compute this metric, such as an edit distance metric (e.g., Levenshtein Distance metric), Jaccard index metric, etc. The first phase yields a set of top-ranked candidate BOTs. The BOT selection logic 512 includes a second phase (L2) which assigns a final score to each candidate BOT in the set, using an expanded group of features. The second phase L2 can use any of the models described above.

As another possible aspect, the BOT selection logic 512 can use various techniques to increase the diversity of candidate BOTs in its output results. For example, by using a DNN, the BOT selection logic 512 can pick candidate BOTs that are not only close to the input query, but sufficiently different from each other. The DNN can achieve this result by ensuring that the high-level vectors associated with the candidate BOTs are mutually separated from each other by at least a prescribed distance (as measured using any distance metric, such as cosine similarity).

A feature-providing component 514 generates the features that are used by the BOT selection logic 512. For instance, the feature-providing component 514 can generate a usage-based feature for a candidate BOT based on a number of times that users have accessed that candidate BOT. The feature-providing component 514 can generate a ratings-based feature for the candidate BOT based on an average rating that users have given the candidate BOT. The feature-providing component can generate a time-based feature which specifies the time at which the search is performed. The feature-providing component can generate a location-based feature that describes the location at which the user is located, and so on.

The feature-providing component 514 can generate at least one type of feature that is derived based on the signals in the signal data store 114. For example, with respect to a particular candidate BOT X under consideration, the feature-providing component 514 can generate a first feature that describes a number of distinct calling BOTs which have called BOT X within some specified prior period of time. The feature-providing component 514 can generate a second feature that describes a total number of times any calling BOT has called the BOT X. The feature-providing component 514 can generate a third feature that describes a number of distinct calling BOTs which have manifest files that specify BOT X; or that information can be taken into consideration by the first-mentioned feature.

The search engine 122 can operate in either a user-agnostic mode or a user-aware mode. For example, the feature-providing component 514 can generate a first class of features for each candidate BOT that describe the behavior of all users who have submitted searches within some prior identified period of time. Alternatively, or in addition, the feature-providing component 514 can generate a second class of features for each candidate BOT that reflects the specific prior behavior of the user who has submitted the input query in the present circumstance. For example, the feature-providing component 514 can generate one kind of feature that measures the total number of calling BOTs that have called the BOT X regardless of the users who have interacted with those BOTs. The feature-providing component 514 can generate a second feature that describes the total number of calling BOTs that have called BOT X, and where the current user was the user who interacted with those BOTs.

Further, the feature-providing component 514 can take account of the time at which actions took place in its calculation of the features. For example, again consider the case in which the feature-providing component 514 is determining a feature based on a number of times that BOTs have called a given BOT X. The feature-providing component 514 can discount the weight of each delegation event based on the currency of that event, e.g., such that an "older" delegation event at time $t_x$ is discounted by a greater amount than a "newer" delegation event at time $t_y$, where time $t_x$ occurs before time $t_y$.

A.5. The Recommendation Engine

Figure 6:
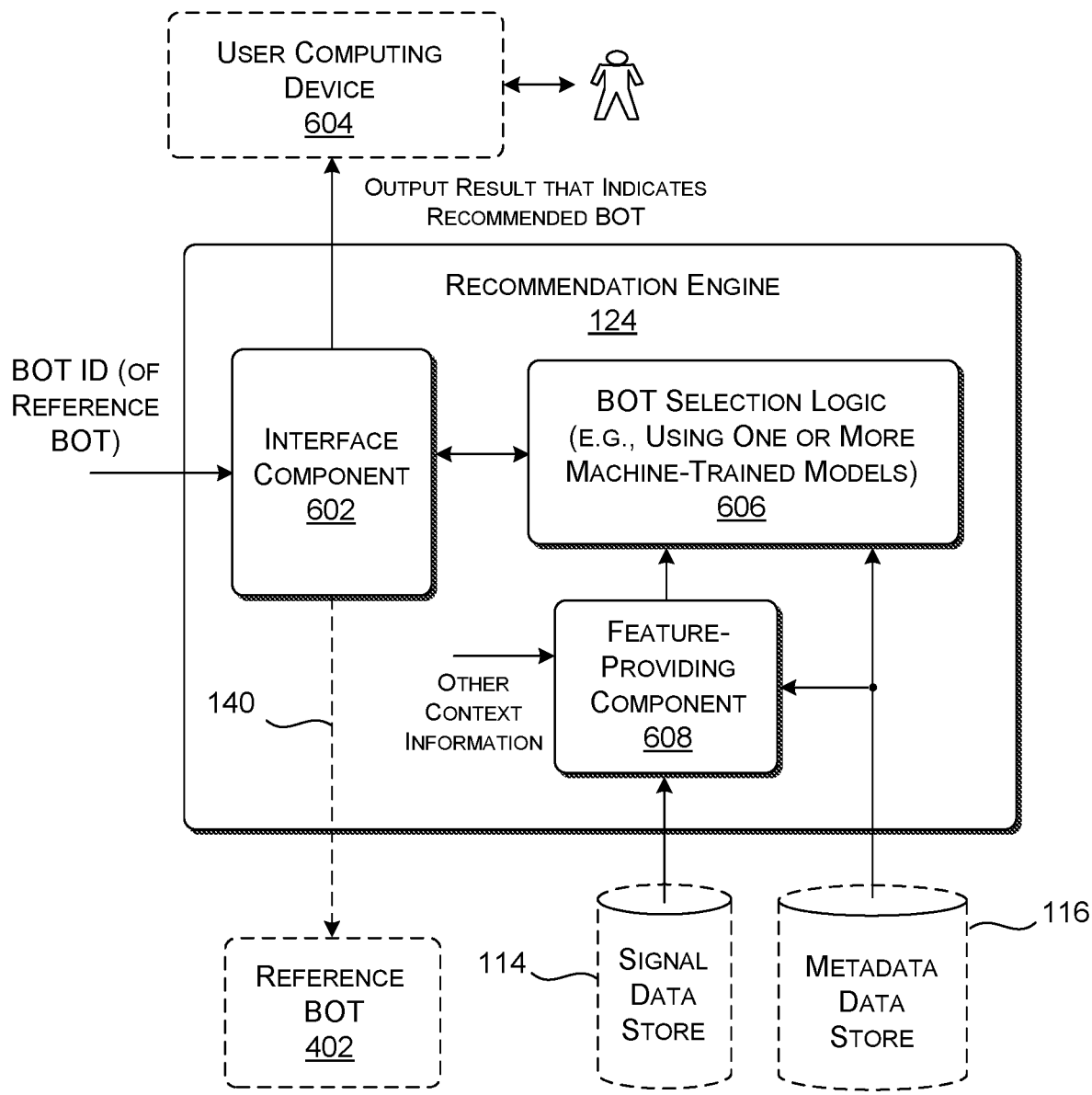
FIG. 6 shows one implementation of a recommendation engine for use in the computing environment of FIG. 1.

FIG. 6 shows one implementation of the recommendation engine 124. As described in Subsection A.1., the recommendation engine 124 recommends one or more candidate BOTs, with respect to a context associated with a reference BOT. For example, in the example of FIG. 4, the user is currently interacting with a hotel-related BOT, which constitutes a reference BOT (e.g., the aforementioned BOT 402) that establishes the user's current context. The recommendation engine 124 recommends one or more other BOTs that are deemed suitable complements to the reference BOT 402.

The recommendation engine 124 includes an interface component 602 for receiving an input signal that identifies the reference BOT. For example, the interface component 602 can receive the input signal from the reference BOT itself. The interface component 602 also sends an output result to one or more target entities. The output result identifies one or more recommended candidate BOTs. For example, the interface component 602 can send the output result, conveyed by an output signal, to a user via a user computing device 604. For instance, in the example of FIG. 4, the interface component 602 can present the output result in the user interface presentation 408. The user interface presentation 408 may display the recommended candidate BOTs in any manner, such as by displaying a set of icons 414 associated with the recommended candidate BOTs. In other cases, the interface component 602 in cooperation with the user computing device 604 can present the recommended candidate BOTs in spoken form.

More specifically, in one case, the interface component 602 can communicate the output result to the user computing device 604 in direct fashion. The user computing device 604 displays the output result in an appropriate slot of the user interface presentation 408. Or the interface component 602 can first send the output result to the reference BOT 402, whereupon the reference BOT 402 compiles the user interface presentation 408 that includes the output result.

Alternatively, or in addition, the interface component 602 can update a data store provided by the reference BOT 402 which identifies one or more recommended BOTs. The reference BOT 402 can then automatically invoke a recommended BOT that is specified in that data store when a triggering event occurs. For example, the reference BOT 402 can determine whether the user has entered a message which contains an explicit or implicit reference to a car rental-related BOT. If so, the reference BOT 402 can retrieve the identity of the top-ranked car rental-related BOT from the data store. The reference BOT 402 can then automatically invoke that recommended BOT. Or the reference BOT 402 can send a message to the user which invites the user to invoke the recommended BOT.

BOT selection logic 606 generates the output result that identifies the recommended BOT(s). More specifically, the BOT selection logic 606 can generate a score for each candidate BOT based on features generated by a feature-providing component 608. The BOT selection logic 606 can use any model to perform task. For example, the BOT selection logic 606 can use a DNN to map a vector representation of the reference BOT to a first vector ($v_1$) in high-level semantic space. The DNN can map a vector representation of a candidate BOT (and all of the features associated therewith) to a second vector ($v_2$) in the high-level semantic space. The DNN can then generate a score which reflects the distance of the first vector to the second vector, e.g., using a cosine similarity metric. That score reflects an extent to which the candidate BOT is a suitable complement to the reference BOT. The DNN can also improve the diversity of the recommended candidate BOTs using the technique described in the previous subsection.

The BOT selection logic 606 can use other models to generate a score for each candidate BOT, such as a weighted sum of feature values, a collaborative filter model, and so on.

The feature-providing component 608 can generate the same kinds of general features described above with reference to the search engine 122 (such as usage-based features, ranking-based features, location-based features, time-based features, user-based features, etc.). In addition, the feature-providing component 608 can generate one or more features for each candidate BOT that are derived from signals in the signal data store 114. For example, the feature-providing component 608 can provide a feature which identifies a number of times that the reference BOT, acting as a calling BOT, has activated a called BOT under consideration. The feature-providing component 608 can provide another feature which identifies a number of times that a BOT under consideration, acting as a calling BOT, has activated the reference BOT. Other features can describe the number of called BOTs that have been called by the reference BOT, and the number of calling BOTs that have called the reference BOT, etc. Other features can identify manifest-related links from the reference BOT to other BOTs, and vice versa.

In one implementation, the model(s) used by the BOT selection logic 606 can treat a number of times at which the reference BOT has contacted a particular candidate BOT as a positive measure of the relevance of the given candidate BOT. But it can treat evidence that many other BOTs (besides the reference BOT) have often delegated control to the same candidate BOT as a possible discounting factor. The motivation behind this treatment is that, if the candidate BOT is commonly accessed by many BOTs, the candidate BOT is likely a well-known BOT that the user already knows about. And hence, the user may not need a recommendation for that candidate BOT.

As in the case of the search engine 122, the BOT selection logic 606 of the recommendation engine 124 can generate features in a user-agnostic manner and/or a user-aware manner. The BOT selection logic 606 can also discount the contribution of delegation events based on their currency, that is, by decreasing the relevance of an event in proportion to its age.

A.6. The Metadata-Supplementing Component

Figure 7:
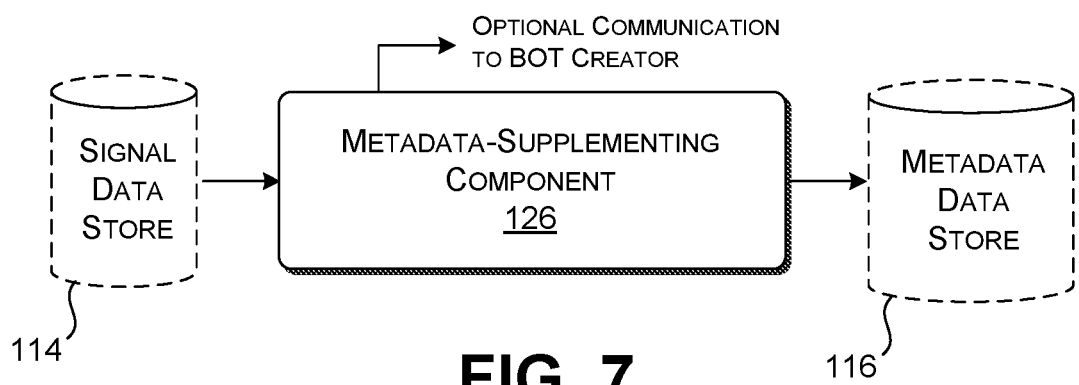
FIG. 7 shows one implementation of a metadata-supplementing component for use in the computing environment of FIG. 1.

FIG. 7 shows one implementation of the metadata-supplementing component 126 introduced in the context of FIG. 1. The metadata-supplementing component 126 generates metadata items based, in part, on signals provided in the signal data store 114. Each metadata item describes some property of a BOT under consideration. The metadata-supplementing component 126 then automatically adds the new metadata items to the metadata data store 116.

Alternatively, the metadata-supplementing component 126 sends a message to the creator of the BOT under consideration, informing the creator of one or more proposed new metadata items pertaining to the BOT under consideration. The metadata-supplementing component 126 then updates the metadata data store 116 upon receiving approval from the creator.

The metadata-supplementing component 126 can use different techniques to generate different types of metadata items for a given BOT. In a first technique, the metadata-supplementing component 126 treats any signal in which the given BOT calls another BOT to fulfill a particular intent as evidence that the given BOT does not have the capability of satisfying that intent. In contrast, the metadata-supplementing component 126 treats any signal in which the given BOT is called on by another BOT to fulfill a particular intent as evidence that the given BOT does have the capability of satisfying that intent. The metadata-supplementing component 126 can generate one or more metadata items based on this evidence. Each such metadata item expresses a presumed capability or lack of capability of the given BOT. For example, in one implementation, the metadata-supplementing component 126 can store a metadata item that indicates that BOT X does not have capability M when BOT X calls one or more other BOTs to fulfill capability M more than a prescribed number g of times, where g is any environment-specific setting. The metadata item can also express a level of certainty associated with its assertion. That level depends on the number of signals that support a conclusion and the number of signals that contradict the conclusion. Further, the metadata-supplementing component 126 can discount any signal based on its temporal "freshness," e.g., by discounting an event that occurred one year ago by a greater amount compared to an event that occurred one month ago.

The metadata-supplementing component 126 can generate capability-related metadata items of the above type with respect to any scope. For example, assume that a lowest level of intent pertains to the purchase of a product or service. The metadata-supplementing component 126 can generate one or more metadata items that indicate whether the given BOT can fulfill that specific intent. That specific intent, in turn, may be a species of a more general intent, such as an intent to perform a financial transaction. The metadata-supplementing component 126 can compile statistical measures for that more general intent and generate one or more metadata items based on those statistical measures.

The metadata-supplementing component 126 can use the same technique to infer the category of a given BOT, e.g., based on the observation that an intent to purchase a particular product corresponds to a sales-related category.

In another technique, the metadata-supplementing component 126 can compute a ranking of a given BOT based on the respective rankings of BOTs which have called the given BOT, and/or based on the respective ranking of BOTs which the given BOT has called. In one approach, the metadata-supplementing component 126 can compute the ranking R(u) of a given BOT u based on the equation:

$$R(u) = \sum_{x \in C_x} \frac{R(x)}{H(x)},$$

where $C_x$ is the set of all BOTs which have called BOT u, x is a BOT in the set $C_x$, R(x) is the ranking of BOT x, and H(x) is a number of times that the BOT x has, in turn, called other BOTs. The metadata-supplementing component 126 can compute the ranking of each BOT u using an iterative approach.

As an end-result of its operation, the metadata-supplementing component 126 produces an enhanced metadata data store 116. The search engine 122 and the recommendation engine 124 use the metadata data store 116 to generate features that describe each candidate BOT under consideration. By enhancing the metadata data store 116, the metadata-supplementing component 126 also produces the indirect result of improving the accuracy of the search engine 122 and recommendation engine 124.

B. Illustrative Processes

FIGS. 8-11 show processes that explain the operation of the system 108 of Section A in flowchart form. Since the principles underlying the operation of the system 108 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

Beginning with FIG. 8, this figure shows a process 802 that describes one manner of operation of the system 108 of FIG. 1. In block 804, the system 108 automatically detects, using detection logic 110, an occasion in which any first BOT, referred to as a calling BOT, delegates control to a second BOT, referred to as a called BOT, in a course of providing a service to a user. The system 108 also detects when the calling BOT is preconfigured to interact with the called BOT. Each BOT within a collection of BOTS 104 corresponds to a computer-implemented agent that provides a service to a user in response to input information provided by the user. In one implementation, the detection logic 110 corresponds to a component that is external to the calling BOT. In block 806, the system 108 stores a signal in a signal data store 114 in response to the detecting operation. In block 808, the system 108 selects a candidate BOT within the collection of BOTs based on a collection of features, including at least one feature that is based on signals stored in the signal data store 114. In block 810, the system 108 provides an output result, conveyed by an output signal, that identifies the candidate BOT that has been selected. In block 812, the computing environment 102 invokes the candidate BOT identified in the output result in response to an activation event.

In one implementation, the detection logic 110 is configured to perform detection by intercepting signals within the collection of BOTs. The signals may correspond to message flows, calls, commands, etc. Alternatively, or in addition, the detection logic 110 can perform detection by probing the capabilities of the calling BOT, e.g., by accessing a manifest file associated with the calling BOT.

FIG. 9 shows a process 902 describes one manner of operation of the search engine 122 of FIG. 5. In block 904, the search engine 122 receives an input query from a user computing device 504 operated by the user. Blocks 906, 908, and 910 correspond to one implementation of block 808 of FIG. 8. That is, in block 906, the search engine 122 provides features for each BOT under consideration among the collection of BOTs 104. At least one of the features is based on the signals stored in the signal data store 114. In block 908, the search engine 122 generates a score for each BOT under consideration based on the features, the score reflecting an extent to which the BOT under consideration matches the input query. In block 910, the search engine 122 chooses one or more BOTs based on the scores associated with the respective BOTs under consideration, the BOT(s) including at least the candidate BOT. Block 912 corresponds to one implementation of block 810 of FIG. 8; here, the search engine 122 sends an output result that identifies at least the candidate BOT to the user computing device 504. In block 914, the search engine 122 receives an instruction by the user device to activate the candidate BOT, wherein the activation event corresponds to the instruction sent by the user computing device 504 to activate the candidate BOT.

Figure 10:
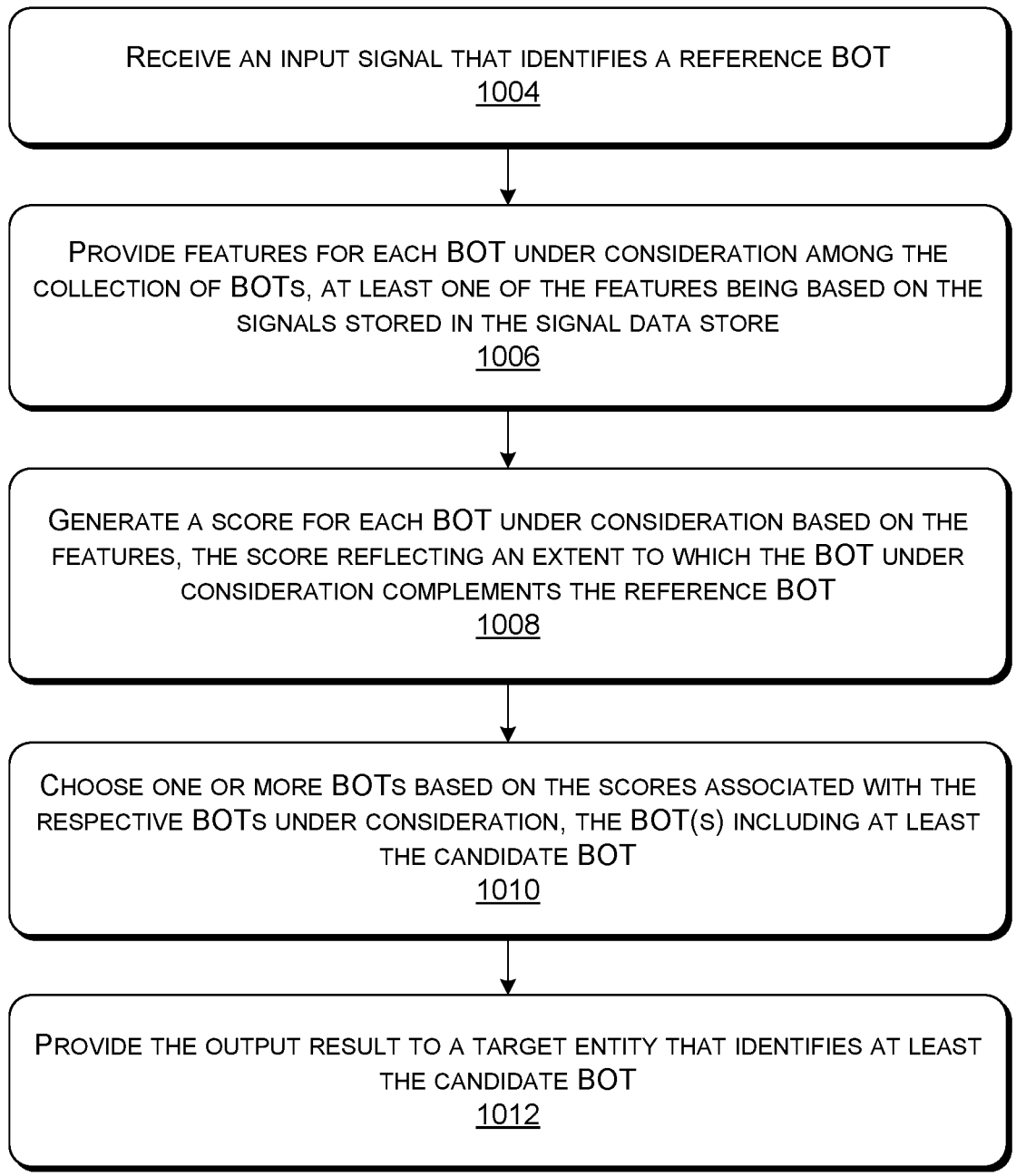
FIG. 10 is a flowchart that shows one manner of operation of the recommendation engine of FIG. 6.

FIG. 10 shows a process 1002 that describes one manner of operation of the recommendation engine 124 of FIG. 6. In block 1004, the recommendation engine 124 receives an input signal that identifies a reference BOT. Blocks 1006, 1008, and 1010 correspond to one implementation of block 808 of FIG. 8. That is, in block 1006, the recommendation engine 124 provides features for each BOT under consideration among the collection of BOTs 104. At least one of the features is based on the signals stored in the signal data store 114. In block 1008, the recommendation engine 124 generates a score for each BOT under consideration based on the features, the score reflecting an extent to which the BOT under consideration complements the reference BOT. In block 1010, the recommendation engine 124 chooses one or more BOTs based on the scores associated with the respective BOTs under consideration, the BOT(s) including at least the candidate BOT. Block 1012 corresponds to one implementation of block 810 of FIG. 8; here, the recommendation engine 124 provides an output result to a target entity that identifies at least the candidate BOT.

Figure 11:
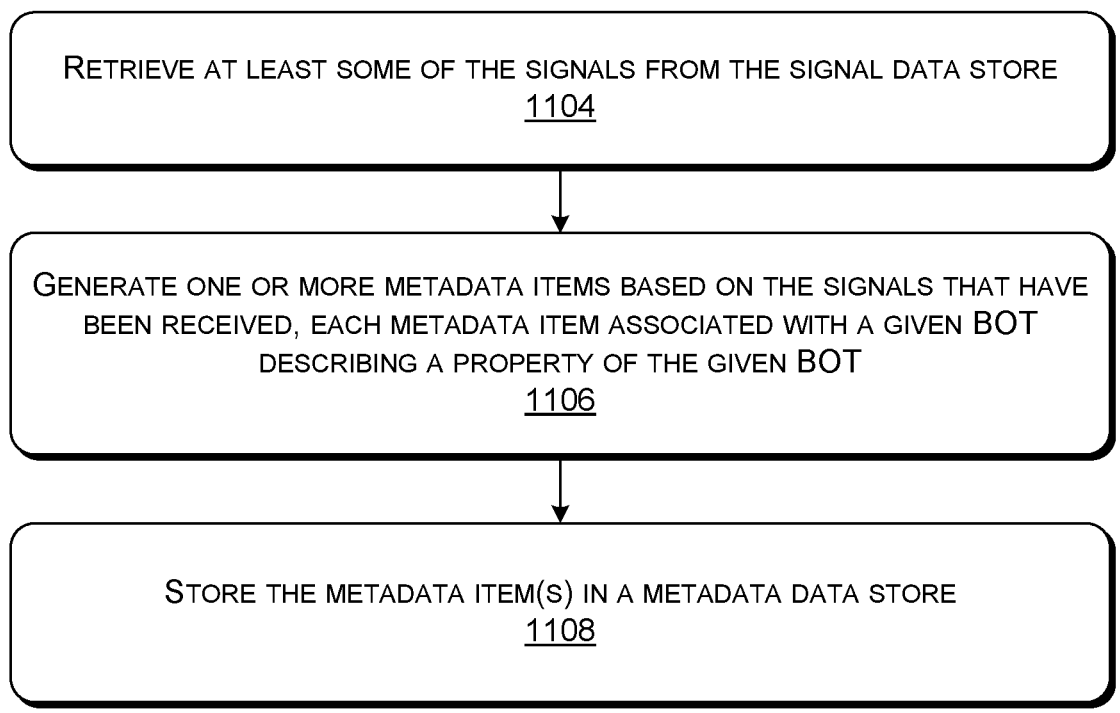
FIG. 11 is a flowchart that shows one manner of operation of the metadata-supplementing component of FIG. 7.

FIG. 11 shows a process 1102 that describes one manner of operation of the metadata-supplementing component 126 of FIG. 7. In block 1104, the metadata-supplementing component 126 retrieves at least some of the signals from the signal data store 114. In block 1106, the metadata-supplementing component 126 generates one or more metadata items based on the signals that have been received; each metadata item that is associated with a given BOT describes a property of the given BOT. In block 1108, the metadata-supplementing component 126 stores the metadata item(s) in a metadata data store 116.

C. Representative BOT Logic

Figure 12:
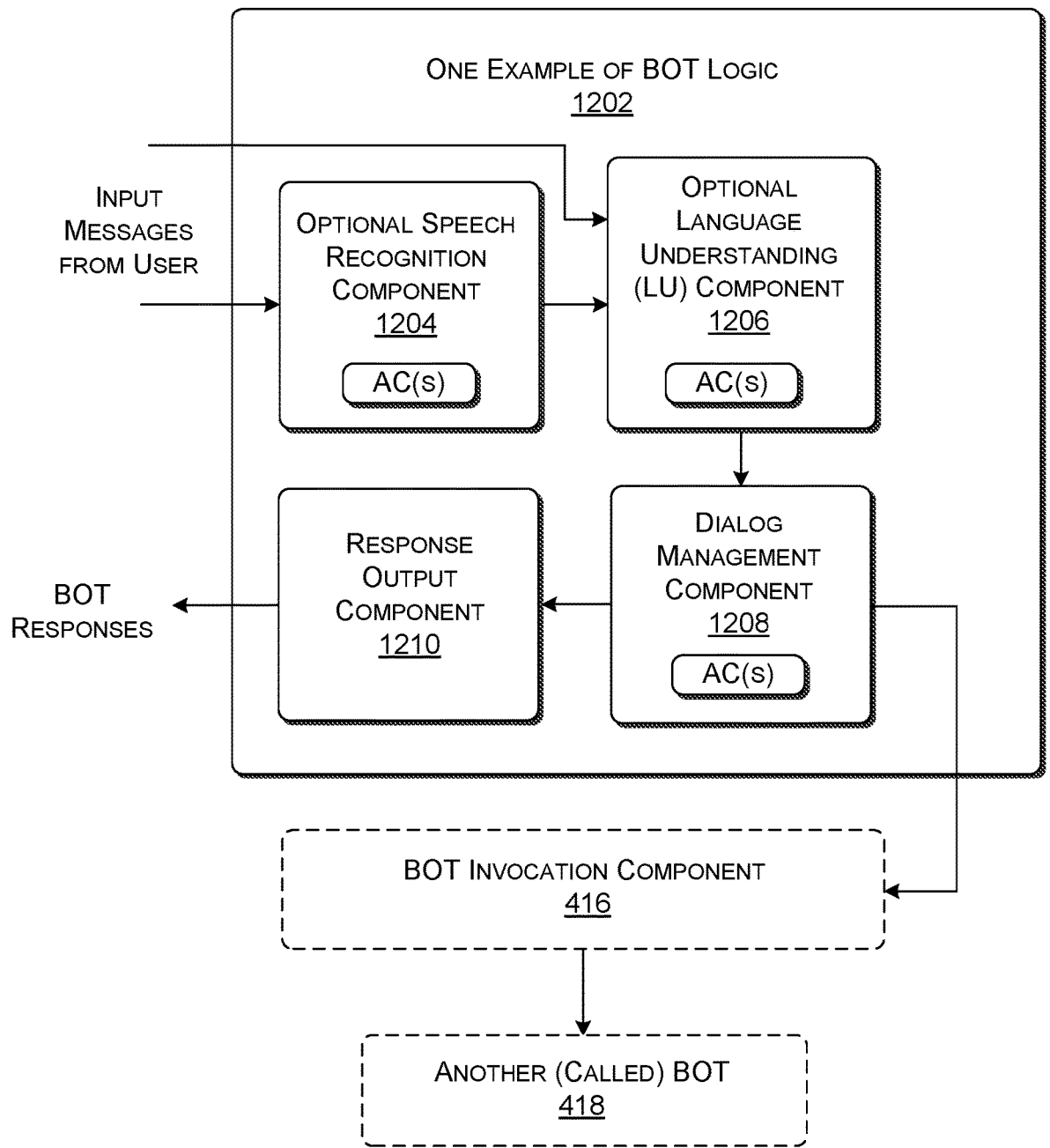
FIG. 12 shows illustrative BOT logic for use in the representative BOT of FIG. 4.

FIG. 12 shows illustrative BOT logic 1202 for use in the representative BOT of FIG. 4. At the outset, however, it is pointed out that the computing environment 102 is specifically designed to interact with a wide variety of BOTs of different types having different respective BOT logics; the particular BOT logic 1202 shown in FIG. 12 is therefore presented here in the spirit of illustration, not limitation.

In one implementation, the BOT logic 1202 includes four principal parts. As a first part, an optional speech recognition component 1204 receives an input signal from one or more audio input devices (not shown). In some cases, for instance, that input signal expresses a user's utterance as an audio waveform signal, captured by one or more microphones. The speech recognition component 1204 converts the input signal into recognized speech information. The speech recognition component 1204 can use any analysis component(s) (labeled in FIG. 12 as AC(s)) to perform this task, such as a deep neural network of any type.

In an alternative case, the BOT logic 1202 receives the user's messages in text form, which, for instance, the user may type into an input interface, such as the user interface presentation 408 of FIG. 4. In this case, the BOT logic 1202 omits the use of the speech recognition component 1204 in its processing of the input messages.

In a second part, a language understanding (LU) component 1206 optionally uses one or more analysis components (AC(s)) to interpret the user's input message. In response to this analysis, the LU component 1206 outputs an interpreted user message. In one implementation, the LU component 1206 includes at least one domain determination component, at least one intent determination component, and at least one slot value determination component.

More specifically, the optional domain determination component determines the most probable domain associated with the input message. A domain pertains to the general theme to which an input message pertains, which may correspond to a set of tasks handled by a particular application, or a subset of those tasks. For example, the command "find Mission Impossible" pertains to a media search domain.

The intent determination component determines an intent associated with the input message. An intent corresponds to an objective that a user likely wishes to accomplish by submitting an input message. For example, a user who submits the command "find Mission Impossible" intends to find a particular movie having the name of "Mission Impossible." A user who submits the command "buy Mission Impossible" intends to purchase the movie "Mission Impossible," and so on.

The slot value determination component determines slot values in the input message. The slot values correspond to information items that an application needs to perform a requested task, upon interpretation of the input message. For example, the command, "find Jack Nicolson movies in the comedy genre" includes a slot value "Jack Nicolson" that identifies an actor having the name of "Jack Nicolson," and a slot value "comedy," corresponding to a requested genre of movies.

Any of the domain determination component, intent determination component, and slot value determination component can use any technology to perform their respective functions. For example, any of these components can use one or more machine-trained models. To cite merely one illustrative and non-limiting case, the domain determination component may correspond to a machine-trained classification model, such as a linear model, a deep neural network model, a clustering-based model, a decision tree model, a support vector machine model, and so on. The intent determination component can likewise correspond to any of these kinds of models.

The slot value determination component may correspond to a machine-learned Conditional Random Fields (CRF) model. In this approach, a CRF model provides the most probable slot sequence defined by:

$$\hat{Y} = \underset{Y}{\operatorname{argmax}}\ p(Y\,|\,X).$$

In this equation, the term X refers to a sequence of tokens in a detected linguistic item $(x_1, x_2, \ldots, x_T)$ and Y refers to a sequence of tags $(y_1, y_2, \ldots, y_r)$ assigned to the tokens, where the tags are selected from a set C of possible tags. The tags correspond to slot variables, such as, in the media search domain, the tags, "actor name," "release date," "genre," etc. In the above example, the CRF model would determine that the term "Jack Nicolson" corresponds to an actor name, having the particular value "Jack Nicolson."

Alternatively, or in addition, any of the domain determination component, the intent determination component, and/or the slot value determination component can use a rule application engine to perform its respective analysis. For example, any of these components can apply rules which maps certain keywords in an input message into appropriate classification results. For instance, the intent determination component can apply a rule that indicates that any input message that matches the template "buy <x>" refers to an intent to buy a particular product, where that product is identified by the value of variable x.

In a third part of the BOT logic 1202, a dialog management component 1208 uses one or more analysis components (AC(s)) to track the state of the ongoing conversation and to map the interpreted input message into a BOT response. In one implementation, the dialog management component 1208 can use a machine-learned model (such as a recursive neural network) to perform its mapping operation. Alternatively, or in addition, the dialog management component 1208 can use a rules-based engine to perform its mapping operation. Alternatively, or in addition, the dialog management component 1208 can generate a BOT response based on one or more dialog script templates provided in a data store.

In a fourth part, a response output component 1210 converts the BOT response generated by the dialog management component 1208 into an appropriate output form, and then sends the converted BOT response to user. For example, the response output component 1210 can use a text-to-speech synthesizer to convert a text-based representation of the BOT response into audio form.

In one implementation, the intent determination model of the LU component 1206 can determine whenever the user makes an explicit or implicit reference to a particular intent associated with another (called BOT), such as BOT 418, e.g., using any of the techniques described above in Subsection A.3. The dialog management component 1208 can then send a signal to the BOT invocation component 416. The BOT invocation component 416, in turn, responds to the signal by invoking the called BOT 418, or inviting the user to invoke the called BOT 418, etc.

In other implementations, a BOT can rely on shared resources in the computing platform (which hosts the collection of BOTs 104) to perform one or more of the operations described above.

D. A Representative Computing Device

Figure 13:
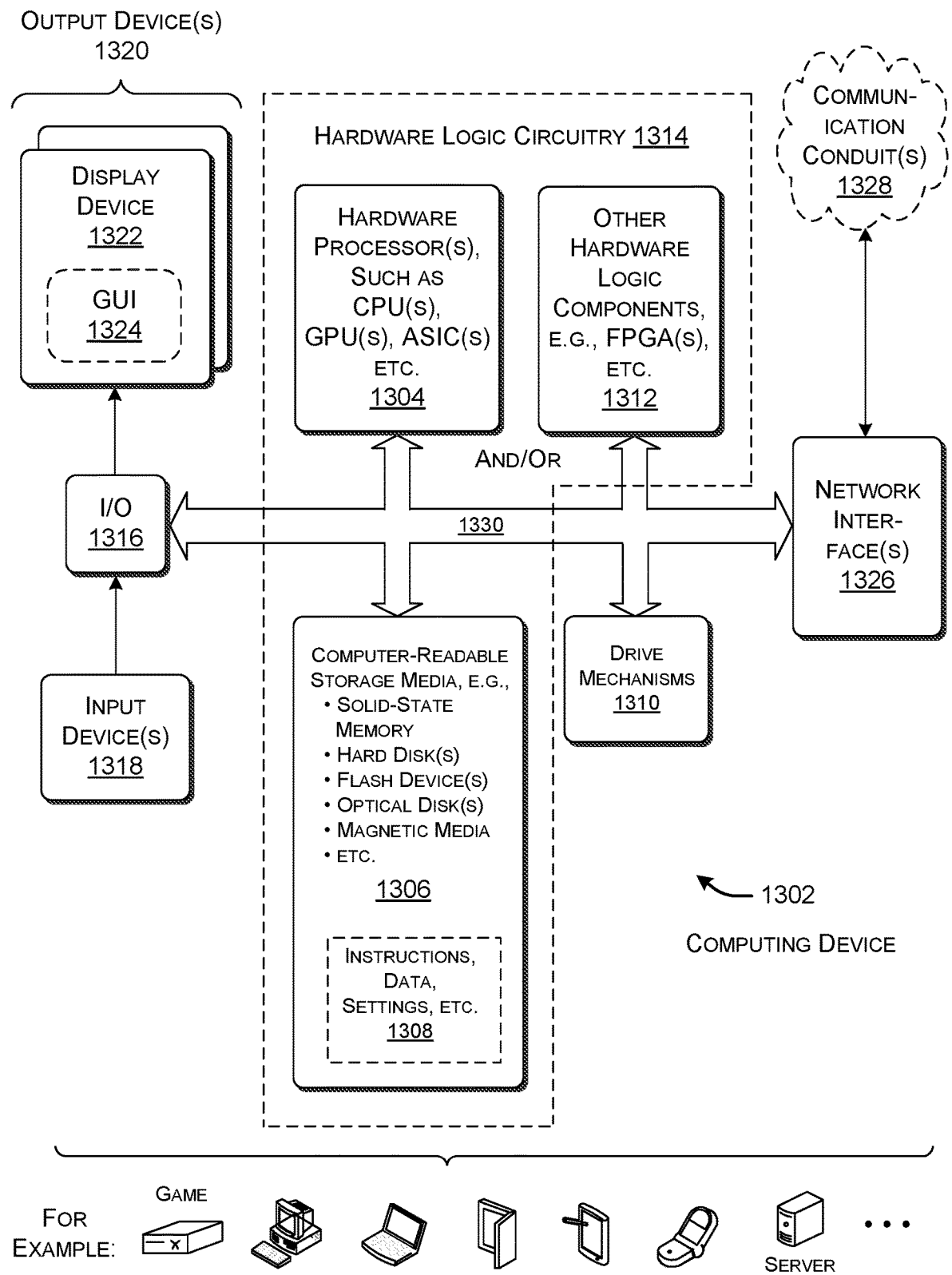
FIG. 13 shows illustrative computing functionality that can be used to implement any aspect of the features shown in the foregoing drawings.

FIG. 13 shows a computing device 1302 that can be used to implement any aspect of the mechanisms set forth in the above-described figures. For instance, the type of computing device 1302 shown in FIG. 13 can be used to implement the servers (204, 206) and/or the user computing devices 106 shown in FIG. 2. In all cases, the computing device 1302 represents a physical and tangible processing mechanism.

The computing device 1302 can include one or more hardware processors 1304. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1302 can also include computer-readable storage media 1306, corresponding to one or more computer-readable media hardware units. The computer-readable storage media 1306 retains any kind of information 1308, such as machine-readable instructions, settings, data, etc. Without limitation, for instance, the computer-readable storage media 1306 may include one or more solid-state devices, one or more flash devices, one or more magnetic hard disks, one or more optical disks, magnetic tape, and so on. Any instance of the computer-readable storage media 1306 can use any technology for storing and retrieving information. Further, any instance of the computer-readable storage media 1306 may represent a fixed or removable component of the computing device 1302. Further, any instance of the computer-readable storage media 1306 may provide volatile or non-volatile retention of information.

The computing device 1302 can utilize any instance of the computer-readable storage media 1306 in different ways. For example, any instance of the computer-readable storage media 1306 may represent a hardware memory unit (such as Random Access Memory (RAM)) for storing transient information during execution of a program by the computing device 1302, and/or a hardware storage unit (such as a hard disk) for retaining/archiving information on a more permanent basis. In the latter case, the computing device 1302 also includes one or more drive mechanisms 1310 (such as a hard drive mechanism) for storing and retrieving information from an instance of the computer-readable storage media 1306.

The computing device 1302 may perform any of the functions described above when the hardware processor(s) 1304 carry out computer-readable instructions stored in any instance of the computer-readable storage media 1306. For instance, the computing device 1302 may carry out computer-readable instructions to perform each block of the processes described in Section B.

Alternatively, or in addition, the computing device 1302 may rely on one or more other hardware logic components 1312 to perform operations using a task-specific collection of logic gates. For instance, the hardware logic component(s) 1312 include a fixed configuration of hardware logic gates, e.g., that are created and set at the time of manufacture, and thereafter unalterable. Alternatively, or in addition, the other hardware logic component(s) 1312 include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 13 generally indicates that hardware logic circuitry 1314 corresponds to any combination of the hardware processor(s) 1304, the computer-readable storage media 1306, and/or the other hardware logic component(s) 1312. That is, the computing device 1302 can employ any combination of the hardware processor(s) 1304 that execute machine-readable instructions provided in the computer-readable storage media 1306, and/or one or more other hardware logic component(s) 1312 that perform operations using a fixed and/or programmable collection of hardware logic gates.

In some cases (e.g., in the case in which the computing device 1302 represents a user computing device), the computing device 1302 also includes an input/output interface 1316 for receiving various inputs (via input devices 1318), and for providing various outputs (via output devices 1320). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1322 and an associated graphical user interface presentation (GUI) 1324. The display device 1322 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1302 can also include one or more network interfaces 1326 for exchanging data with other devices via one or more communication conduits 1328. One or more communication buses 1330 communicatively couple the above-described components together.

The communication conduit(s) 1328 can be implemented in any manner, e.g., by a local area computer network, a wide area computer network (e.g., the Internet), point-to-point connections, etc., or any combination thereof. The communication conduit(s) 1328 can include any combination of hardwired links, wireless links, routers, gateway functionality, name servers, etc., governed by any protocol or combination of protocols.

FIG. 13 shows the computing device 1302 as being composed of a discrete collection of separate units. In some cases, the collection units may correspond to discrete hardware units provided in a computing device chassis having any form factor. FIG. 13 shows illustrative form factors in its bottom portion. In other cases, the computing device 1302 can include a hardware logic component that integrates the functions of two or more of the units shown in FIG. 1. For instance, the computing device 1302 can include a system on a chip (SoC or SOC), corresponding to an integrated circuit that combines the functions of two or more of the units shown in FIG. 13.

The following summary provides a non-exhaustive list of illustrative aspects of the technology set forth herein.

According to a first aspect, a system, implemented by one or more computing devices, is described for selecting a BOT. The system includes hardware logic circuitry implemented by one or more hardware processors that execute machine-readable instructions stored in a memory, and/or by one or more other hardware logic components that perform operations using a task-specific collection of logic gates. The hardware logic circuitry, in turn, includes detection logic configured to automatically detect a delegation event in which any first BOT, referred to as a calling BOT, delegates control to a second BOT, referred to as a called BOT, in a course of providing a service to a user, or to detect that the calling BOT is preconfigured to interact with the called BOT. Each BOT within a collection of BOTs corresponds to a computer-implemented agent that provides a service to a user in response to input information provided by the user. The detection logic is configured to perform detection by intercepting signals within the collection of BOTs and/or probing capabilities of the calling BOT. The hardware logic circuitry further includes a signal collection component configured to store a signal in a signal data store in response to detection of the delegation by the detection logic. The hardware logic circuitry further includes a BOT-selecting component configured to select a candidate BOT within the collection of BOTs based on a collection of features, including at least one feature that is based on signals stored in the signal data store, and to provide an output result, via an output signal, that conveys the candidate BOT that has been selected. The candidate BOT identified in the output result is invoked in response to an activation event.

According to a second aspect, the detection logic is configured to detect delegation by the calling BOT to the called BOT when the detection logic detects a reference to the called BOT in a message stream associated with the calling BOT.

According to a third aspect, the detection logic is configured to detect delegation by the calling BOT to the called BOT when the detection logic detects a call and/or command exchanged between the calling BOT and the called BOT.

According to a fourth aspect, the detection logic is configured to detect that the calling BOT is preconfigured to interact with the called BOT when the detection logic detects that a file associated with the calling BOT includes a reference to the called BOT.

According to a fifth aspect, each signal in the signal data store includes at least: a first data item that identifies the calling BOT; a second data item that identifies the called BOT; and a third data item that identifies an intent that the called BOT is called on to fulfill.

According to a sixth aspect, the BOT-selecting component corresponds to a search engine. The search engine includes: an interface component configured to receive an input query from a user computing device operated by the user; and a feature-providing component configured to provide features for each BOT under consideration among the collection of BOTs, at least one of the features being based on the signals stored in the signal data store. The search engine further includes BOT selection logic configured to: generate a score for each BOT under consideration based on the features, the score reflecting an extent to which the BOT under consideration matches the input query; and choose one or more BOTs based on scores associated with the respective BOTs under consideration, the BOT(s) including at least the candidate BOT. The interface component is further configured to send the output result that identifies at least the candidate BOT to the user device. The activation event corresponds to an instruction sent by the user, via the user computing device, to activate the candidate BOT.

According to a seventh aspect, the BOT-selecting component corresponds to a recommendation engine. The recommendation engine includes: an interface component configured to receive an input signal that identifies a reference BOT; and a feature-providing component configured to provide features for each BOT under consideration among the collection of BOTs, at least one of the features being based on the signals stored in the signal data store. The recommendation engine further includes BOT selection logic configured to: generate a score for each BOT under consideration based on the features, the score reflecting an extent to which the BOT under consideration complements the reference BOT; and choose one or more BOTs based on scores associated with the respective BOTs under consideration, the BOT(s) including at least the candidate BOT. The interface component is further configured to provide the output result to a target entity that identifies at least the candidate BOT.

According to an eighth aspect, dependent on the seventh aspect, the target entity is a user computing device operated by the user. Further, the activation event corresponds to an instruction sent by the user, via the user computing device, to activate the candidate BOT.

According to a ninth aspect, dependent on the seventh aspect, the target entity is the reference BOT. Further, the activation event corresponds to an instruction by the reference BOT to automatically activate the candidate BOT upon an occurrence of a triggering event.

According to a tenth aspect, the hardware logic circuitry further includes a metadata-supplementing component configured to: retrieve at least some of the signals from the signal data store; generate one or more metadata items based on the signals that have been received, each metadata item that is associated with an identified BOT describing a property of the identified BOT; and store the metadata item(s) in a metadata data store.

According to an eleventh aspect, dependent on the tenth aspect, one metadata item that is generated for a given BOT indicates whether the given BOT is capable of satisfying a specified intent. A signal indicating that the given BOT calls one or more other BOTs to perform the specified intent constitutes evidence that the given BOT cannot perform the specified intent. A signal indicating that the given BOT is called by one or more other BOTs to perform the specified intent constitutes evidence that the given BOT performs the specified intent.

According to a twelfth aspect, dependent on the tenth aspect, one metadata item that is generated for a given BOT is a rating score associated with the given BOT. The rating score for the given BOT is derived based one or more rating scores that are respectively associated with one or more other BOTs that are interactively linked to the given BOT.

According to a thirteen aspect, a method, implemented by one or more computing devices, is described for selecting a BOT. The method includes: automatically detecting, using detection logic, an occasion in which any first BOT, referred to as a calling BOT, delegates control to a second BOT, referred to as a called BOT, in a course of providing a service to a user, or detecting that the calling BOT is preconfigured to interact with the called BOT. Each BOT within a collection of BOTs corresponds to a computer-implemented agent that provides a service to a user in response to input information provided by the user. The detection logic is a component that is external to the calling BOT. The method further includes: storing a signal in a signal data store in response to the detecting operation; selecting a candidate BOT within the collection of BOTs based on a collection of features, including at least one feature that is based on signals stored in the signal data store; providing an output result, via an output signal, that conveys the candidate BOT that has been selected; and invoking the candidate BOT identified in the output result in response to an activation event.

According to a fourteenth aspect, the detecting operation is performed by the detection logic by: intercepting a message stream associated with the calling BOT, and detecting a reference to the called BOT in the message stream; and/or intercepting a call and/or command exchanged between the calling BOT and the called BOT; and/or interrogating a file associated with the calling BOT to determine whether the file includes a reference to the called BOT.

According to a fifteenth aspect, the method (associated with the thirteenth aspect) further includes receiving an input query from a user computing device operated by the user. The selecting operation includes: providing features for each BOT under consideration among the collection of BOTs, at least one of the features being based on the signals stored in the signal data store; generating a score for each BOT under consideration based on the features, the score reflecting an extent to which the BOT under consideration matches the query; and choosing one or more BOTs based on scores associated with the respective BOTs under consideration, the BOT(s) including at least the candidate BOT. The operation of providing the output result involves sending the output result that identifies at least the candidate BOT to the user computing device. The method further includes receiving an instruction by the user computing device to activate the candidate BOT, wherein the activation event corresponds to the instruction sent by the user computing device to activate the candidate BOT.

According to a sixteenth aspect, the method (associated with the thirteenth aspect) further includes receiving an input signal that identifies a reference BOT. The selection operation includes: providing features for each BOT under consideration among the collection of BOTs, at least one of the features being based on the signals stored in the signal data store; generating a score for each BOT under consideration based on the features, the score reflecting an extent to which the BOT under consideration complements the reference BOT; and choosing one or more BOTs based on scores associated with the respective BOTs under consideration, the BOT(s) including at least the candidate BOT. The operation of providing of the output result involves providing the output result to a target entity that identifies at least the candidate BOT.

According to a seventeenth aspect (dependent on the sixteenth aspect), the target entity is a user computing device operated by the user. Further, the activation event corresponds to an instruction sent by the user, via the user computing device, to activate the candidate BOT.

According to an eighteenth aspect (dependent on the sixteenth aspect), the target entity is the reference BOT. Further, the activation event corresponds to an instruction by the reference BOT to automatically activate the candidate BOT upon an occurrence of a triggering event.

According to a nineteenth aspect, the method (associated with the thirteenth aspect) further includes: retrieving at least some of the signals from the signal data store; generating one or more metadata items based on the signals that have been received, each metadata item associated with a given BOT describing a property of the given BOT; and storing the metadata item(s) in a metadata data store.

According to a twentieth aspect, a computer-readable storage medium is described for storing computer-readable instructions. The computer-readable instructions, when executed by one or more hardware processors, perform a method that includes: automatically detecting an occasion in which any first BOT, referred to as a calling BOT, delegates control to a second BOT, referred to as a called BOT, in a course of providing a service to a user, or detecting that the calling BOT is preconfigured to interact with the called BOT, wherein each BOT corresponds to a computer-implemented agent that provides a service to the user in response to input information provided by the user; storing a signal in a signal data store in response to the detecting operation; selecting a candidate BOT within a collection of BOTs based on the signals stored in the signal data store; and providing an output result, communicated via an output signal, that conveys the candidate BOT that has been selected. The selecting operation is based on a collection of features, including at least one feature that is derived from the signals stored in the signal data store, the features reflecting delegation of control among BOTs in the collection of BOTs to fulfill different intents. The method further includes supplementing information provided in a metadata data store based on BOT capabilities inferred from the signals in the signal data store.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   hardware logic circuitry implemented by one or more hardware processors that execute machine-readable instructions stored in a memory, and/or by one or more other hardware logic components that perform operations using a task-specific collection of logic gates, the hardware logic circuitry being configured to implement a BOT-selecting component, and
   a signal data store storing BOT delegation signals that have been intercepted from communications among a collection of conversational BOTs that execute on one or more computing devices that are remote from the system, wherein each BOT delegation signal includes at least:
   a first data item that identifies a specific calling conversational BOT from the collection of conversational BOTs;
   a second data item that identifies a specific called conversational BOT from the collection of conversational BOTs; and
   a third data item that identifies a specific intent that the specific called conversational BOT is called on to fulfill by the specific calling conversational BOT during a course of a specific previous natural language conversation involving the specific calling conversational BOT, the specific called conversational BOT, and a specific human user, wherein the specific previous natural language conversation does not involve the BOT-selecting component,
   wherein:
   the BOT-selecting component is configured to receive an input query from a particular user, the input query specifying a particular intent of the particular user;
   the BOT-selecting component is configured to choose a selected conversational BOT that matches the input query from the collection of conversational BOTs based at least on a BOT delegation feature, derived from the BOT delegation signals in the signal data store, reflecting that another conversational BOT has previously delegated control directly to the selected conversational BOT to fulfill the particular intent specified by the input query during a course of a particular previous natural language conversation; and
   the BOT-selecting component is configured to provide an output result, via an output signal, that conveys the selected conversational BOT.

2. The system of claim 1, wherein the hardware logic circuitry is configured to implement detection logic and the detection logic is configured to:
   detect that the another conversational BOT delegated control directly to the selected conversational BOT by inserting a reference to the selected conversational BOT during the particular previous natural language conversation,
   wherein the BOT-selecting component is configured to determine that the selected conversational BOT is capable of fulfilling the particular intent specified by the input query based at least on the another conversational BOT having inserted the reference to the selected conversational BOT during the particular previous natural language conversation.

3. The system of claim 1, wherein the hardware logic circuitry is configured to implement detection logic and the detection logic is configured to:
   detect that the another conversational BOT delegated control directly to the selected conversational BOT by sending an application programming interface (API) call or command directly to the selected conversational BOT during the particular previous natural language conversation,
   wherein the BOT-selecting component is configured to determine that the selected conversational BOT is capable of fulfilling the particular intent specified by the input query based at least on the another conversational BOT having sent the API call or command directly to the selected conversational BOT during the particular previous natural language conversation.

4. The system of claim 1, wherein the BOT-selecting component includes a search engine that is configured to:
generate scores for conversational BOTs under consideration, the scores reflecting extents to which the conversational BOTs under consideration match the input query, wherein the scores are based at least in part on respective BOT delegation features, derived from the BOT delegation signals in the signal data store, reflecting instances in which other conversational BOTS delegated control directly to the conversational BOTS under consideration during multiple previous natural language conversations involving other users; and
choose the selected conversational BOT that matches the input query from among the conversational BOTs under consideration based at least on the scores,
wherein the output result is provided to a particular user computing device that submits the input query to the search engine.

5. The system of claim 1, wherein the BOT-selecting component includes a recommendation engine that is configured to:
receive an input signal that identifies a reference conversational BOT having a current natural language conversation with the particular user;
generate scores for conversational BOTs under consideration, the scores reflecting extents to which the conversational BOTs under consideration complement the reference conversational BOT having the current natural language conversation with the particular user, wherein the scores are based at least in part on respective conversational BOT delegation features derived from the BOT delegation signals in the signal data store, reflecting instances in which other conversational BOTS delegated control directly to the conversational BOTS under consideration during multiple previous natural language conversations involving other users;
choose another selected conversational BOT from among the conversational BOTs under consideration based at least on the scores; and
send another output result that conveys the another selected conversational BOT to a target entity.

6. The system of claim 5,
wherein the target entity is a particular user computing device operated by the particular user.

7. The system of claim 5, wherein the target entity is the reference conversational BOT.

8. The system of claim 1, wherein the BOT-selecting component is configured to:
retrieve at least some of the BOT delegation signals from the signal data store;
generate one or more metadata items based at least on the BOT delegation signals that have been retrieved, each metadata item being associated with an identified conversational BOT and describing a property of the identified conversational BOT; and
store said one or more metadata items in a metadata data store.

9. The system of claim 8,
wherein one metadata item that is generated for a given conversational BOT indicates whether the given conversational BOT is capable of satisfying a specified intent,
wherein the one or more metadata items are generated by interpreting a given BOT delegation signal indicating that the given conversational BOT calls one or more other conversational BOTs during a given natural language conversation to perform the specified intent as evidence that the given conversational BOT cannot perform the specified intent, and
wherein the one or more metadata items are generated by interpreting a wherein the one or more metadata items are generated by interpreting a further BOT delegation signal indicating that another given conversational BOT is called by one or more further conversational BOTs to perform the specified intent during a further given natural language conversation as evidence that the another given conversational BOT performs the specified intent.

10. The system of claim 8,
wherein one metadata item that is generated for a given conversational BOT is a rating score associated with the given conversational BOT, and
wherein the rating score for the given conversational BOT is derived based at least one or more rating scores that are respectively associated with one or more other conversational BOTs that are interactively linked to the given conversational BOT.

11. The system of claim 1, wherein the another conversational BOT is preconfigured to delegate control to the selected conversational BOT to fulfill the particular intent before the BOT-selecting component chooses the selected conversational BOT to handle queries related to the particular intent.

12. A method comprising:
by a BOT-selecting component executing on a particular computing device, accessing a signal data store having BOT delegation signals that have been intercepted from communications among a collection of conversational BOTs that execute on one or more other computing devices that are remote from the particular computing device, wherein each BOT delegation signal includes at least:
a first data item that identifies a specific calling conversational BOT from the collection of conversational BOTs;
a second data item that identifies a specific called conversational BOT from the collection of conversational BOTs; and
a third data item that identifies a specific intent that the specific called conversational BOT is called on to fulfill by the specific calling conversational BOT during a course of a specific previous natural language conversation involving the specific calling conversational BOT, the specific called conversational BOT, and a specific human user, wherein the specific previous natural language conversation does not involve the BOT-selecting component,
by the BOT-selecting component executing on the particular computing device, receiving an input query having a particular intent;
by the BOT-selecting component executing on the particular computing by the BOT-selecting component executing on the particular computing device, choosing a selected conversational BOT that matches the input query based at least on a particular BOT delegation feature, derived from the signal data store, reflecting that another conversational BOT directly invoked the selected conversational BOT to fulfill the particular intent of the input query during a particular previous natural language conversation involving the selected conversational BOT, the another conversational BOT, and at least one of the human users;
by the BOT-selecting component executing on the particular computing device, providing an output result via an output signal that conveys the selected conversational BOT that has been chosen; and invoking the selected conversational BOT identified in the output result in response to an activation event.

13. The method of claim 12, further comprising populating the signal data store by:

intercepting one or more natural language message streams associated with multiple calling conversational BOTs and detecting references to the multiple called conversational BOTs in the one or more natural language message streams; and intercepting calls or commands exchanged directly between multiple other calling conversational BOTs and multiple other called conversational BOTs executing on the one or more other computing devices.

14. The method of claim 12, further comprising:

by the BOT-selecting component executing on the particular computing device:

generating scores for conversational BOTs under consideration, the scores reflecting extents to which individual conversational BOTs match the input query, wherein the scores are based at least in part on respective BOT delegation features, derived from the BOT delegation signals in the signal data store, reflecting instances in which other conversational BOTS executing on the one or more other computing devices delegated control directly to the conversational BOTS under consideration executing on the one or more other computing devices without involvement of the particular computing device;

choosing the selected conversational BOT from the conversational BOTs under consideration based at least on the scores; and sending the output result that conveys the selected conversational BOT to a user computing device that provides the input query;

receiving the activation event via an instruction by the user computing device to activate the selected conversational BOT; and invoking the selected conversational BOT to conduct another natural language conversation with a respective human user of the user computing device responsive to the instruction.

15. The method of claim 12, further comprising:

by the BOT-selecting component executing on the particular computing device:

receiving an input signal that identifies a reference conversational BOT with which a particular human user is currently having a particular natural language conversation;

generating scores for conversational BOTS under consideration, the scores reflecting extents to which the conversational BOTs under consideration complement the reference conversational BOT, wherein the scores are based at least in part on respective BOT delegation features, derived from the BOT delegation signals in the signal data store, reflecting instances in which other conversational BOTS delegated control to the conversational BOTS under consideration during multiple previous natural language conversations involving other human users;

choosing another selected conversational BOT from among the conversational BOTs under consideration based at least on the scores; and providing another output result that conveys the another selected conversational BOT to a target entity.

16. The method of claim 15, wherein the target entity is a user computing device, and the activation event comprises an instruction received from the user computing device.

17. The method of claim 15, wherein the target entity is the reference conversational BOT, and the activation event comprises an instruction received from the reference conversational BOT.

18. The method of claim 12, wherein the selected conversational BOT comprises a car rental BOT and the another conversational BOT comprises a hotel BOT that has previously delegated control directly to the car rental BOT during the particular previous natural language conversation without involvement of the BOT-selecting component.

19. A computer-readable storage device storing computer-readable instructions, the computer-readable instructions, when executed by one or more hardware processors of a first computing device, causing the one or more hardware processors to perform acts comprising:

by a BOT-selecting component executing on the first computing device, accessing a signal data store of BOT delegation signals that have been intercepted from communications among a collection of conversational BOTs that execute on one or more other computing devices that are remote from the first computing device, wherein each BOT delegation signal includes at least:

a first data item that identifies a specific calling conversational BOT from the collection of conversational BOTs;

a second data item that identifies a specific called conversational BOT from the collection of conversational BOTs; and a third data item that identifies a specific intent that the specific called conversational BOT is called on to fulfill by the specific calling conversational BOT during a course of a specific previous natural language conversation involving the specific calling conversational BOT, the specific called conversational BOT, and a specific human user, wherein the specific previous natural language conversation does not involve the BOT-selecting component, by the BOT-selecting component executing on the first computing device, deriving, from the BOT delegation signals stored in the signal data store, BOT delegation features;

by the BOT-selecting component executing on the first computing device, receiving an input query from a particular human user;

by the BOT-selecting component executing on the first computing device and based at least on the BOT delegation features, identifying a selected conversational BOT that matches the input query and that executes on the one or more other computing devices, the selected conversational BOT having a corresponding BOT delegation feature reflecting that another conversational BOT that executes on the one or more other computing devices has previously delegated control directly to the selected conversational BOT to fulfill a particular intent related to the input query during a course of a particular previous natural language conversation; and outputting an identifier of the selected conversational BOT to the particular human user via a user interface.

20. The computer-readable storage device of claim 19, wherein the selected conversational BOT is selected based at least on the input query having one or more keywords indicative of the particular intent, and the selected conversational BOT has previously fulfilled the particular intent during the course of the particular previous natural language conversation with another human user.

21. The computer-readable storage device of claim 19, wherein the signal data store identifies multiple instances where the another conversational BOT has delegated control to the selected conversational BOT to fulfill the particular intent by inserting a particular symbol into a message stream.

\* \* \* \* \*